US012735142B2

(12) United States Patent
Schwenk et al.

(10) Patent No.: US 12,735,142 B2
(45) Date of Patent: Sep. 15, 2026

(54) DRIVE UNIT OF A VEHICLE WHICH CAN BE OPERATED BY MEANS OF MUSCLE POWER AND/OR MOTOR POWER

(71) Applicant: Robert Bosch GmbH, Stuttgart (DE)

(72) Inventors: Daniel Schwenk, Dornstetten (DE); Sigmund Braun, Kusterdingen (DE); Christoph Schumacher, Dusslingen (DE); Harald Hundt, Aichelberg (DE); Julian Binder, Wannweil (DE); Peter Kimmich, Steinenbronn (DE); Stefan Holst, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 437 days.

(21) Appl. No.: 18/320,015

(22) Filed: May 18, 2023

(65) Prior Publication Data

US 2023/0391419 A1 Dec. 7, 2023

(30) Foreign Application Priority Data

Jun. 3, 2022 (DE) ........................ 10 2022 205 714

(51) Int. Cl.
*B62M 6/55* (2010.01)

(52) U.S. Cl.
CPC .................................... *B62M 6/55* (2013.01)

(58) Field of Classification Search
CPC .......... B62M 1/36; B62M 3/003; B62M 6/55; B62K 19/34
See application file for complete search history.

(56) References Cited

U.S. PATENT DOCUMENTS 10,300,985 B2 5/2019 Mano
2017/0016526 A1* 1/2017 Watarai ................ F16H 57/025
(Continued)

FOREIGN PATENT DOCUMENTS

CN 204587213 U 8/2015
DE 696 31 853 T2 8/2004
(Continued)

OTHER PUBLICATIONS

Kameda et al., Drive Unit for Human-Powered Drive Vehicle, Jul. 29, 2021, EPO, JP 2021-107184 A, Machine Translation of Description (Year: 2021).*
(Continued)

*Primary Examiner* — James A English
(74) *Attorney, Agent, or Firm* — Maginot, Moore & Beck LLP

(57) ABSTRACT

A drive unit of a vehicle includes a motor and a crankshaft mechanically coupled by a transmission and located within a housing. The transmission includes a first gear wheel rotatable about a motor axis and a second gear wheel rotatable about a crank axis. The housing includes a first fastening region and a second fastening region, configured for fastening the drive unit to a frame interface of the vehicle, wherein, in a cutting plane through the drive unit and orthogonally to the crank axis, a longitudinal axis is defined that intersects the crank axis and the motor axis, and a first line is defined that is orthogonal to the longitudinal axis and tangential on an outer circumference of the motor, and wherein the first fastening region has a first center point arranged on the first line or on a side of the first line facing away from the crank axis.

20 Claims, 16 Drawing Sheets

(56) References Cited

U.S. PATENT DOCUMENTS

| | | | | |
|---|---|---|---|---|
| 2023/0043341 | A1* | 2/2023 | Kawakami | H02K 7/14 |
| 2023/0219651 | A1* | 7/2023 | Fleischer | B62K 19/34 280/281.1 |

FOREIGN PATENT DOCUMENTS

| | | | | | |
|---|---|---|---|---|---|
| DE | 10 2016 112 778 | A1 | | 1/2017 | |
| DE | 10 2019 204 108 | A1 | | 10/2019 | |
| DE | 10 2020 123 761 | A1 | | 3/2021 | |
| DE | 10 2020 134 353 | A1 | | 7/2021 | |
| DE | 10 2020 200 385 | A1 | | 7/2021 | |
| DE | 10 2020 210 864 | A1 | | 3/2022 | |
| EP | 4 079 619 | A1 | | 10/2022 | |
| JP | S52-2934 | A | | 1/1977 | |
| JP | 2019177841 | A | * | 10/2019 | B62K 19/34 |
| JP | 2021107184 | A | * | 7/2021 | B62M 6/55 |
| WO | 2014/125817 | A1 | | 8/2014 | |
| WO | 2019/176999 | A1 | | 9/2019 | |

OTHER PUBLICATIONS

Noda et al., Human-Powered Drive Vehicle, Oct. 17, 2019, USPTO, JP 2019-177841 A, Machine Translation of Description (Year: 2019).*

* cited by examiner 2
25a
25
23
28
91d
24
21
21c
95b
95
91
91a
95a
200
95d
95c
91c
29
95f
300
81
24a
21a
A
29a
22
22a
92c
92h
90
92a
92
82
91e 2
92f
92c
92g
82
92
92a
22a
25a
83
25
91e
22
23
28
24
91e
24a
A
29a
21
91d
21c
91c
21a
95d
95b
81
95
91
91a
95a
95c
95f
29
200
300

120
101g
101f
101
92a
92
101a
1
82
22a
25
3
A
28
21a
2
91
91a
200
29
300

93a
91
91b
2
21a
A
22
22a
92
92b
94a 1
93a
44
41
42
44
91
91b
2
21a
A
28
22
22a
92
92b
44
41
42
44
94a 1
32
32b
51
32c
45
42
3
5
28
2
20
41
45
72
29
71
7
31
53
91
31a 1
32
44
32b
51

32c
45
2b
43a
43
42
2c
33
3
27
20a
28
41
20
2
43a
45
43
2a
44
29
7
72
71
31
91
31a 1
32e
32
44
32b
54b
51

3
30
45
32c
2b
56
43
42
2c
20a
41
20
43
2
5
2a
56
30
45
7
44
31
72
71
53
31a
31e 1
3
32
44
51
42
56
2b
2c
20
2
2a
5
41
56
41g
7
31
72
71
53

DRIVE UNIT OF A VEHICLE WHICH CAN BE OPERATED BY MEANS OF MUSCLE POWER AND/OR MOTOR POWER

This application claims priority under 35 U.S.C. § 119 to patent application no. DE 10 2022 205 714.7, filed on Jun. 3, 2022 in Germany, the disclosure of which is incorporated herein by reference in its entirety.

The present disclosure relates to a drive unit of a vehicle which can be operated by means of muscle power and/or motor power, a drive assembly, and a vehicle.

BACKGROUND

Vehicles are known, such as electric bicycles, that have drive units held between two walls of a frame interface. The drive unit is typically screwed to the two oppositely arranged walls. In view of the number and location of the screw connection points, there are often conflicting requirements with regard to compact and lightweight construction on the one hand and high stability and optimum power transmission on the other hand.

SUMMARY

The drive unit according to the disclosure having the features disclosed herein, by contrast, is characterized in that a mounting of a drive unit which is advantageous in terms of load is made possible with simultaneously compact design and low weight. A particularly simple and cost-efficient production and assembly of the drive unit is made possible as well. This is achieved by a drive unit of a vehicle which can be operated by means of muscle power and/or motor power, in particular an electric bicycle, comprising a motor, a crankshaft, a transmission, and a housing. The motor has a motor axis. The crankshaft has a crank axis. The transmission mechanically couples the motor and the crankshaft to one another, in particular for torque transmission. The motor and the transmission are arranged within the housing. The transmission comprises at least a first gear wheel which is rotatable about the motor axis and a second gear wheel which is rotatable about the crank axis. Preferably, the transmission can additionally comprise at least a third gear wheel arranged between the first gear wheel and the second gear wheel, in particular such that the transmission forms a multi-stage transmission. The housing comprises a first fastening region and a second fastening region. The two fastening regions are configured so as to fasten the drive unit to a frame interface of the vehicle. Preferably, the drive unit comprises solely the first fastening region and the second fastening region for fastening to a frame interface.

In a cutting plane which intersects the drive unit, in particular centrally, and which is orthogonal to the crank axis, a longitudinal axis is defined, which intersects the crank axis and the motor axis. Additionally, in the cutting plane, a first line is defined that is orthogonal to the longitudinal axis and is arranged tangentially on an outer circumference of the motor. In particular, the first line is arranged on one side of the motor facing away from the crank axis. The first fastening region has a first center point, wherein the first center point is arranged on the first line or on a side of the first line facing away from the crank axis.

In other words, the drive unit can be fastened to a frame interface of a vehicle by means of the two fastening regions, wherein the motor-side first fastening region is arranged along the longitudinal axis in a region of the first line tangentially arranged on the motor, said region facing away from the crank axis.

Preferably, the motor is an electric motor, which preferably comprises a stator and a rotor that is rotatable about the motor axis relative to the stator. The outer circumference of the motor is in particular considered to be an outer dimension of the stator, that is in particular a maximum dimension of the electric motor.

Preferably, the first fastening region in the direction of travel of the vehicle to which the drive unit is mountable lies in front of the second fastening region.

The drive unit offers the advantage of an optimal geometric design, which allows for an advantageous mechanical fastening at the same time as compactness and possibility of weight savings. Due to the arrangement of the first fastening region on the first line or on the side of the first line facing away from the crank axis, there is a large distance between the first fastening region and the crank axis. Thus, there is a large lever arm between these two points. Forces introduced via the crankshaft into the drive unit can thereby be optimally absorbed on a frame interface or by the frame interface, in particular due to pedal actuation of a driver of the vehicle. For example, a fastening means on the first fastening region and/or the frame interface on the fastening region can thus be dimensioned less robustly, thereby conserving design space and weight.

The disclosure provides preferred further developments.

Preferably, the longitudinal axis separates a vehicle-facing region from a region facing away from the vehicle from one another. The first center point is on the longitudinal axis or within the vehicle-facing region. In particular, the vehicle-facing region thus corresponds to a vertically upper region of the drive unit when the drive unit is mounted in the region of the bottom bracket of the vehicle. Thus, an advantageous bearing of the first fastening region can be provided in order to enable a frame interface of the vehicle that requires particularly low design space and material.

Preferably, the first center point lies within a first fastening sector. The first fastening sector is thereby bounded by two straight lines, each intersecting the motor axis. A first angle between a first of the two straight lines and the longitudinal axis is at least 5°, preferably at least 10°, particularly preferably at least 20°. A second angle between a second of the two straight lines is at most 70°, preferably at most 60°, particularly preferably at most 50°. Thus, an optimal compromise between stable mechanical support of the drive unit on the frame interface and also compactness, in particular with a low vertical dimension, of the drive unit can be provided.

Particularly preferably, a first distance of the first center point from the motor axis is at least 130%, preferably at least 140%, particularly preferably at most 180%, of a maximum radius of the motor. In particular, the maximum radius of the motor is defined by an outer circumference of a stator of the motor. Thus, a high stability can be provided with optimum utilization of the space conditions.

Further preferably, a second distance of the first center point from the crank axis is at least 150%, preferably at least 180%, particularly preferably at most 250% of a longitudinal distance, wherein the longitudinal distance is defined as the distance of the motor axis and the crank axis from one another. Thereby, a large lever arm is provided between the crank axis and the first fastening region in order to allow for a particularly stable arrangement.

Preferably, a third distance of the first center point from a second center point of the second fastening region is at least 120%, preferably at least 130%, preferably at most 150% of the second distance of the first center point from the crank axis. Thus, due to a large distance between the two fastening regions, a particularly stable construction can be enabled with respect to the forces to be introduced by the drive unit into the frame interface. At the same time, a design of the drive unit can be provided that is as compact as possible.

Further preferably, a fourth distance of the second center point from the crank axis is at most 180%, preferably at most 140% of a maximum radius of the second gear wheel. Thus, an optimum support of mechanical forces can be provided with compact drive unit geometry.

Particularly preferably, the longitudinal axis separates a vehicle-facing region and a region facing away from the vehicle from one another, wherein the second center point of the second fastening region is arranged on the longitudinal axis or within the vehicle-facing region. Thus, both fastening regions are arranged within the vehicle-facing region, that is to say vertically above the motor axis and crank axis. Thus, in addition to a compact drive unit, a particularly space-saving and material-saving frame interface can also be provided.

Preferably, a second line is further defined, which lies in the cutting plane that intersects the drive unit and is orthogonal to the crank axis. The second line is arranged orthogonally to the longitudinal axis and tangentially on an outer circumference of the second gear wheel. In particular, the second line is arranged on a side of the second gear wheel facing away from the motor. The second center point of the second fastening region is arranged on a side of the second line facing the motor axis. As a result, a particularly simple and material-saving frame interface can be provided on the vehicle, because, for example, the two fastening regions can be substantially arranged at a vertical height.

Preferably, a third line is further defined, which lies in the cutting plane orthogonal to the crank axis through the drive unit. The third line is orthogonal to the longitudinal axis and intersects the crank axis. The second center point of the second fastening region lies between the second line and the third line. As a result, a large distance between the first fastening region and the second fastening region can be provided in order to enable a particularly stable, wide mechanical support of the fastening.

Preferably, a third straight line is defined, which intersects the crank axis and on which the second center point lies. The third straight line is arranged such that a third angle between the third straight line and the longitudinal axis is at least 40°, preferably at least 50°, particularly preferably at most 80°. Thus, the second fastening region lies within a region arranged so as to provide an optimal compromise between wide support and compactness.

Further preferably, the longitudinal axis separates a vehicle-facing region and a region facing away from the vehicle from one another, wherein the second center point is arranged within the region facing away from the vehicle. In this case, the first fastening region and the second fastening region are thus located on opposite sides of the longitudinal axis. Thus, a large distance can be provided between the two fastening regions, which allows for a particularly stable fastening of the drive unit.

Preferably, a second line is defined, which lies in the cutting plane through the drive unit that is orthogonal to the crank axis, wherein the second line is arranged orthogonally to the longitudinal axis and tangentially on an outer circumference of the second gear wheel. In particular, the second line is arranged on a side of the second gear wheel facing away from the motor. The second center point of the second fastening region is arranged on the second line or on a side of the second line facing away from the motor axis. In particular, the first fastening region and the second fastening region are thus at a maximum distance relative to one another on the drive unit housing. The available construction space can thus be optimally exploited in order to enable a particularly wide and stable mechanical support of the drive unit at the two fastening regions.

Preferably, a fastening axis is further defined, on which the first center point lies and which intersects the crank axis. The second center point and the motor axis are arranged on the same side of the fastening axis. In particular, the second center point and the motor axis are arranged on the side of the fastening axis facing away from the vehicle. Thus, particularly advantageous lever ratios can be provided with respect to the mechanical forces occurring in operation.

Preferably, a fourth angle between the fastening axis and a connecting line interconnecting the crank axis and the second center point is at most 30°, preferably at least 10°. Thus, an assembly of the second fastening region far upwards is provided with dimensions of the drive unit that are as compact as possible.

Furthermore, the disclosure relates to a drive assembly of a vehicle which can be operated by means of muscle power and/or motor power, in particular an electric bicycle, comprising the drive unit described above, and a frame interface. The drive unit is arranged at least partially between a first wall and a second wall of the frame interface. The drive unit housing is fastened to each of the two walls by way of each of the two drive unit fastening regions. That is to say, the first fastening region is connected to each of the two walls, in particular by means of a screw connection to one of the two walls, and the second fastening region is also connected to each of the two walls, in particular by means of a screw connection to one of the two walls. Preferably, the frame interface and the drive unit are mechanically connected to one another solely by means of the two fastening regions. The drive assembly is thus characterized by a particularly simple and inexpensive design, which allows for a particularly stable and thus advantageous fastening of the drive unit in terms of load-bearing in a lightweight construction.

Preferably, the frame interface comprises an articulation region configured so as to receive an articulation point of a backing structure of the vehicle. In particular, a main pivot point for a backing structure of a fully suspended electric bicycle can be arranged at the articulation region. The articulated region is arranged in the vehicle-facing region in relation to the assembly of the fastening regions on the drive unit. Further preferably, the articulation region is arranged on the second line or on a side of the second line facing away from the motor axis. Alternatively, the articulated region can also be arranged on a side of the second line facing the motor axis, for example in the case of an alternative installation position of the drive unit. This assembly of the articulation region is particularly advantageous when the second fastening region is arranged in the region facing away from the vehicle. Thus, the articulated region can be positioned particularly close to the crank axis, thereby providing advantageous backing structure kinematics of the vehicle. For example, a chain stay length can thereby be kept as short as possible.

Particularly preferably, a maximum width of the frame interface between the first wall and the second wall is greater at a first connection region than at a second connection region. In particular, the fastening at the first connection region occurs by means of the first fastening region, wherein the fastening at the second connection region occurs by means of the second fastening region. Preferably, the maximum width at the second connection region is at most 90%, preferably at most 80%, particularly preferably at most 70% of the maximum width at the first connection region. A particularly advantageous mechanical connection of the drive assembly to fully suspended electric bicycles can thus take place. Preferably, the narrower second connection region is arranged rearward in the direction of travel. Thereby, an increased design freedom for a backing structure kinematics is available at the second connection region. For example, chain stays and/or a pivot point for a main bearing pivotally connecting the backing structure to the rest of the frame can be optimally positioned with more space. Furthermore, a wide first connection region, preferably in the forward direction of travel, allows for a particularly stable construction. For example, this can particularly advantageously cooperate with a mounting of a battery in a lower tube of the electric bicycle.

Preferably, the drive assembly in each case comprises two screws per fastening region of the drive unit. The drive unit housing is screwed to the two walls of the frame interface by means of the screws, in particular a total of four screws. For example, in each case two screws can be screwed in from opposite sides in order to fasten the drive unit to the frame interface.

Preferably, in each case the drive unit comprises one through-bore per fastening region, in particular which fully penetrates the drive unit. In addition, the drive unit comprises one through-bolt per fastening region, wherein each through-bolt is inserted through the respective through-bore, and the drive unit is fastened to each of the two walls. A particularly simple and at the same time robust fastening of the drive unit to the frame interface can thus be provided.

Particularly preferably, the drive assembly comprises two respective sleeves per through-bore. The two sleeves are inserted on both sides into the respective through-bore. The respective through-bolt is inserted through the two respective sleeves. The sleeves can be used in order to optimally set a desired load state of the drive unit. For example, by a corresponding design of the sleeves, a neutral installed state of the drive unit can be provided, in which no axial forces act on the drive unit, in particular with respect to a longitudinal axis of the through-bolt. Alternatively, the sleeves can, for example, be designed such that, as a result of the clamping by means of the through-bolt, low or high compressive stress acts on the drive unit in the axial direction, which can advantageously affect a tightness of the drive unit against ingress of fluid.

Preferably, the two sleeves contact one another within the through-bore. By means of the through-bolt, the two sleeves are clamped against one another. As a result of the sleeves contacting one another in the through-bore, the axial forces that can occur due to the fastening to the frame interface can be absorbed by the sleeves so that the mechanical load on the drive unit is reduced.

Preferably, each sleeve comprises a shank and a flange. The shank is preferably hollow cylindrical, and the flange is preferably arranged at an axial end of the shank and has a larger outer diameter than the shank. The shank is arranged at least partially inside the through-bore and the flange is arranged outside the through-bore. The flange is in particular configured such that it can rest against an end face of the drive unit surrounding the through-bore and can precisely define an insertion depth of the shank of the sleeve. The desired mechanical load can thus be set particularly easily and precisely.

It is particularly advantageous if the flange of the sleeves can be provided with different thicknesses, in particular with respect to the axial direction of the sleeve. For example, the flange of a sleeve of a first embodiment can have a first thickness, wherein the flange of a sleeve of a second embodiment can have a second thickness which is at least 1.5 times, preferably at least twice, in particular at least three times, the first thickness. This results in the advantage that the width of the drive assembly, preferably measured along an axial direction of the through-bore, can be varied in a particularly simple and cost-efficient manner. For example, the width of the drive assembly can be configured so as to frame interfaces having different widths by varying the thickness of the flanges of the sleeves, so that the drive assembly can be used particularly flexibly and cost-efficiently.

Each sleeve particularly preferably comprises a damping element, which is arranged on a side of the flange facing the drive unit. The damping element is formed from a vibration-damping material. Preferably, the damping element is formed from an elastomer. The damping element provides some damping effect through an elastic deformability between the flange and the drive unit. The drive assembly can thus be designed in a simple and cost-efficient manner such that the drive unit is held without play in the axial direction of the through-bore, for example, wherein the damping element is deformed or partially compressed under pressure. The damping element can also reduce a transmission of oscillations and vibrations between the drive unit and the frame interface. The damping element moreover advantageously provides a sealing effect between the sleeve and the drive unit.

The damping element preferably also surrounds the shank at least partially, preferably entirely, in peripheral direction. The damping element is therefore in particular configured as an overmolding of the shank and the side of the flange facing the shank. The damping element thus provides the advantage of a vibration-mechanically optimized fastening of the drive unit to the frame interface. This has a particularly advantageous effect on a durability of screw connections, because the vibration-damping effect in particular reduces a transmission of oscillations and vibrations and changing dynamic loads as a result of the resilient and damping properties of the damping element. This also reduces or prevents changing mechanical loading of the screw connection, thus making it possible to provide a high degree of durability. An occurrence of unwanted noises, for example, can moreover be reduced as well. The damping element also allows a certain level of tolerance compensation. In addition, there is the advantage of additional protection against corrosion, in particular galvanic corrosion, for example when the drive unit comprises a housing made of magnesium, wherein the sleeves are made of aluminum or steel, for example. An axial and radial sealing effect can furthermore be provided on the drive unit.

The two sleeves are further preferably designed such that, when they are fully inserted into the through-bore and not braced, they are arranged inside the through-bore at a predefined axial distance to one another. In other words, when the sleeves are inserted unclamped in the through-bore, a sum of the axial lengths of the sleeves is less than a total axial length of the through-bore.

Preferably, the predefined axial distance is designed such that in the clamped state of the two sleeves, which is brought about by the through-bolt, the axial distance is compensated due to elastic deformation of the damping element. That is to say, the sleeves contact one another within the through-bore. In other words, the two sleeves are designed in such a way that in the clamped state, when the two sleeves contact one another within the through-bore, the respective damping element of the two sleeves is elastically deformed, in particular pressed between the flange and the drive unit. This makes it particularly easy to set a predetermined load state of the drive unit with a low predetermined compressive load. A seal is moreover reliably ensured by means of the deformed or compressed damping element. The fact that the sleeves touch one another furthermore ensures that the axial mechanical forces are absorbed via the sleeves, so that the through-bolt can be screwed on with high torque, for example, without excessive mechanical loading of the drive unit. At the same time, a particularly stable screw connection can be made as a result.

Preferably, the flange of at least one of the two sleeves comprises a plurality of protruding form-fitting elements on a side facing the corresponding wall. The form-fitting elements are configured so as to be pressed into the wall as a result of the sleeve being screwed to the corresponding wall. The form-fitting elements in particular cause plastic deformation of the wall by pressing into the wall, in particular such that the form-fitting elements and the plastically deformed region of the wall create a form fit in a plane perpendicular to the screw axis. That is to say, on the surface of the flange, the sleeve comprises the protruding form-fitting elements that, as the sleeve and the wall are screwed together, partially dig into the wall, in particular in order to produce, in the plane of the wall surface, a micro form-fit. As a result, a particularly firm connection of the drive unit to the frame interface can be provided since slippage between the sleeve and the wall can be reliably prevented in a simple manner.

Each form-fitting element preferably comprises a pyramid protruding from a surface of the flange of the sleeve. Alternatively, each form-fitting element comprises a cone protruding from a surface of the flange of the sleeve, for example. In other words, a plurality of pyramid tips which project from the surface of the flange are provided as form-fitting elements. The pyramids are particularly preferably pointed, and in particular have an opening angle of less than 60°, preferably less than 45°, so that they can penetrate the wall particularly easily. Such a configuration with pointed pyramids as form-fitting elements is particularly advantageous for screwing the drive unit to carbon frames, i.e. to frame interfaces which consist at least in part of a fiber-reinforced, preferably carbon-fiber-reinforced, plastic. This has the advantage that the pointed pyramids can impress themselves into the network structure of the carbon without damaging it. The fibers are in particular not disrupted when the pyramids penetrate, but can yield and wrap around the respective pyramid.

Each form-fitting element further preferably comprises a recess in the surface of the flange adjacent to, for example surrounding, the pyramid. The recess is preferably configured as an annular groove. Particularly preferably, a single recess is configured in the surface of the flange, on the radial inside and/or outside of which the pyramids are arranged. Alternatively, a separate recess can be configured for each pyramid, wherein the recess is in particular arranged directly adjacent to the pyramid. The depression can, for example, receive the material of the wall that is displaced by the penetration of the pyramid into the wall, in order to enable a reliable and defined abutment of the surface of the flange against the wall.

Preferably, the flange of at least one of the two sleeves comprises a taper at a radially outer end. The flange is preferably disk-shaped. The taper is arranged on the side of the flange that faces the shank. A taper is in particular considered to be a reduction in the thickness of the flange, in particular in the axial direction of the sleeve. The taper is in particular a difference of the maximum thickness and the minimum thickness of the flange, wherein this difference is preferably at least 50%, preferably at most 150%, of a wall thickness of the shank of the sleeve. The taper of the flange is compensated by the damping element. In other words, a thickness of the damping element in the region of the taper is greater than on the remainder of the flange. Preferably, an overall thickness of the damping sleeve is constant in the axial direction in the region of the flange. Alternatively, the damping element can preferably comprise a thickening on a radially outer end of the side facing the shank. By the taper of the flange and the thicker damping element in this region, a softer zone of the damping sleeve can be provided in this region and enables a particularly good seal effect between the damping sleeve and the drive unit.

The drive unit further preferably comprises at least one protruding annular rib which is arranged concentrically to one of the two openings. The annular rib preferably has a conical or trapezoidal cross-section. The protruding annular rib and the taper of the flange of the sleeve are particularly preferably arranged on the same radius with respect to an opening axis of the opening of the drive unit. In other words, the protruding annular rib and the taper of the flange of the sleeve are arranged at the same height relative to the radial direction of the opening of the drive unit. The protruding annular rib can thus optimally dip into the thicker region of the damping element during the assembly of the drive assembly, whereby a particularly good seal effect can be provided between the damping sleeve and the drive unit.

Preferably, the through-bolt is fastened to the second wall. In so doing, the through-bolt clamps the two sleeves and the second wall against one another. In particular, the through-bolt clamps the two sleeves between a bolt head and the second wall. In so doing, the through-bolt is held axially movably on the first wall. In particular, the through-bolt is held immovably, in particular substantially immovably, in a radial direction on the first wall, for example by being at least partially arranged within a through-opening of the first wall. As a result, tolerance compensation between the frame interface with the two walls and the drive unit can take place in a particularly simple manner since the axially movable mounting of the through-bolt on the first wall acts as a floating bearing while the fastening to the second wall acts as a fastening bearing.

Further preferably, the drive assembly furthermore comprises a tolerance compensation element. The first wall also comprises a first wall opening. The tolerance compensation element is formed in the shape of a sleeve and is arranged within the first wall opening. The through-bolt comprises a bolt head, which is arranged within the tolerance compensation element. In particular, the tolerance compensation element is provided to enable an assembly without play between the bolt head and the first wall in the radial direction of the wall opening. Alternatively, a bolt shank of the through-bolt can preferably be arranged within the tolerance compensation element, wherein the through-bolt, together with the tolerance compensation element, is in this case preferably movable axially relative to the first wall. By providing a tolerance compensation element as an additional component, the tolerance compensation can be carried out in a manner that is particularly simple and precisely configured so as to the respective tolerance situation.

Particularly preferably, the tolerance compensation element comprises a sliding bearing bushing and a damping shell, wherein the damping shell surrounds the sliding bearing bushing. For example, the damping shell can completely surround the sliding bearing bushing in the circumferential direction. Alternatively, the damping shell can preferably comprise one or more cutouts. Preferably, the sliding bearing bushing is thus arranged radially inside. This provides for a low-friction sliding contact between the bolt head and the tolerance compensation element, whereby unintended axial clamping between the through-bolt and the first wall can be particularly reliably avoided. The damping shell can prevent or reduce vibration transmission between the first wall and the bolt head on the one hand and can ensure reliable fastening of the tolerance compensation element in the wall opening on the other hand. Preferably, the damping shell is formed from an elastomer.

Preferably, the sliding bearing bushing and the bolt head are designed such that the bolt head widens the sliding bearing bushing in the radial direction when the bolt head is arranged within the tolerance compensation element, in particular in a fully clamped state. For example, this can be achieved by means of a corresponding fit between the bolt head and the sliding bearing bushing. The sliding bearing bushing is preferably configured so as to be tapered toward the drive unit at the inner circumference thereof, wherein the bolt head has a larger diameter. This achieves that the tolerance compensation element is radially pressed into the wall opening of the first wall by the bolt head, whereby a particularly reliable, firm mounting is enabled. Moreover, a radial tolerance can thereby be reduced to zero.

Preferably, the sliding bearing bushing is slotted. The radial widening can thereby be brought about particularly simply and selectively. Moreover, pressing of the tolerance compensation element into the wall opening can thereby be facilitated.

Preferably, the slot of the sliding bearing bushing is arranged obliquely with respect to an axial direction of the sliding bearing bushing, in particular when looking at the slot from a radial direction. This can provide an optimal, even, mechanical support around the entire circumference and over the entire axial length of the sliding bearing bushing.

Particularly preferably, the damping shell comprises at least one sealing lip on a radial outside. The at least one sealing lip is preferably arranged at an axial end of the damping shell. Preferably, a respective sealing lip is arranged at both axial ends. The at least one sealing lip is designed such that there is an axial form-fit between the damping shell and the first wall when the tolerance compensation element is arranged within the first wall opening. In other words, the tolerance compensation element can be clipped into the first wall opening by means of the sealing lip. As a result, a particularly simple and reliable mounting of the tolerance compensation element can be achieved. Moreover, a particularly reliable seal effect is provided at the first wall opening.

Particularly preferably, the damping shell is designed such that the at least one sealing lip is pushed radially outward by the bolt head when the bolt head of the through-bolt is located within the tolerance compensation element. Preferably, a further sealing lip protrudes from the radially inner side of the tolerance compensation element and is pushed radially outward by the bolt head in order to thus also push the radially outer sealing lip outward. Preferably, these two sealing lips are arranged on the side of the tolerance compensation element that faces the drive unit. This ensures that the sealing lip is always positioned toward the drive unit and radially outward. For example, this also prevents a portion of the sealing lip from moving inward in the direction of the sliding bearing bushing as a result of frictional forces.

Preferably, the sliding bearing bushing comprises a radially outward protruding detent lug on at least one axial end, preferably at both axial ends. In particular, the detent lug protrudes radially outward from a cylindrical base body of the sliding bearing bushing. The detent lug can enable reliable fastening of the tolerance compensation element in the wall opening of the first wall, in particular by a form-fit between the detent lug of the sliding bearing bushing and the first wall. Preferably, the sliding bearing bushing can be compressed by the slot during assembly, in order to enable simple assembly. The detent lug can preferably extend around the entire circumference of the sliding bearing bushing or, alternatively, preferably only over a portion of the circumference.

Further preferably, each sleeve comprises a press region. A press fit is formed between the press region and the through-bore. A particularly reliable and defined mounting and power transmission between the sleeves and the drive unit is thus enabled.

The pressing region is preferably arranged, in particular directly, adjacent to the flange. The shank of each sleeve further comprises a tapering region which has a smaller outer diameter than the pressing region. The tapering region is thus in particular arranged on a side of the pressing region opposite to the flange. This allows the tapering region to be inserted easily and smoothly into the through-bore of the drive unit in order to enable easy insertion of the sleeves into the through-bore.

Preferably, the through-bore comprises a centering region which is arranged centrally in the through-bore and has a smaller inner diameter than the rest of the through-bore. The centering region is provided for centering the two sleeves within the through-bore, in particular by means of the respective taper regions. Preferably, a clearance fit is formed between each taper region and the centering region so that smooth insertion of the sleeves is possible, but the centering regions are oriented precisely centrally in the through-bore for an optimal orientation of the two sleeves.

The through-bolt is particularly preferably configured as a screw and screwed into an internal thread of the second wall. Thus a particularly simple, cost-efficient drive assembly can be provided, which is also lightweight because there are fewer components.

The through-bolt is preferably configured as a screw and screwed into a nut arranged on the second wall. Thus a particularly robust screw connection can be provided, for example because the through-bolt and the nut can be made of a harder material than the frame interface. Using through-bolts and nuts made of steel, for example, makes it possible to use a particularly high torque for screwing. Moreover, if the internal thread is damaged, the nut can easily be replaced. The use of a nut also has the further advantage that, due to a radially specified play, it represents a tolerance compensation relative to the wall opening of the first wall and is therefore always precisely aligned.

The nut is preferably arranged in a non-rotatable manner in a recess of the second wall. The nut and recess can have a non-circular geometry, for example, for instance in the form of tangential flats, in particular with respect to an axis of a through-opening through the second wall. As a result, a particularly simple assembly of the drive assembly can be enabled.

Further preferably, the flange of at least one sleeve has a predetermined thickness, in particular in the direction parallel to a longitudinal direction of the sleeve, which is substantially equal to a wall thickness of the shank, in particular in the radial direction. Alternatively, the flange of at least one sleeve preferably has a predetermined thickness, in particular in the direction parallel to a longitudinal direction of the sleeve, which is at least 1.5 times, preferably at least twice, particularly preferably at least three times, a wall thickness of the shank, in particular in the radial direction. A variable width of the drive assembly can thus be provided, which enables adaptation to frame interfaces having different widths in a particularly simple and cost-efficient manner.

The disclosure furthermore leads to a vehicle, preferably a vehicle which can be operated by means of muscle power and/or motor power, preferably an electric bicycle, which comprises the described drive assembly. The frame interface can be part of a vehicle frame of the vehicle, for example.

The vehicle preferably comprises a vehicle frame. The frame interface of the drive assembly is an integral part of the vehicle frame, i.e., the vehicle frame is formed with the frame interface as a one-piece component, wherein the drive unit is preferably directly connected to the frame interface, i.e., in particular without additional intermediate components. Alternatively, the frame interface of the drive assembly and/or one or both of the walls of the frame interface is preferably designed as a separate component from the vehicle frame and connected, preferably screwed, to the vehicle frame. The drive unit can thus be indirectly fastened to the frame interface, for example.

The vehicle particularly preferably further comprises a chainring which is connected to an output shaft of the drive unit. In particular, the crankshaft and the output shaft are mechanically coupled to one another. The second wall of the drive assembly is arranged on the side of the chainring. In particular if a fastening on the second wall is configured as a fastening bearing and a fastening on the first wall is configured as a floating bearing, an optimal direct transmission of force between the drive unit and the chainring can take place. This also ensures precise positioning of the chainring, i.e. an exact chain line.

BRIEF DESCRIPTION OF THE DRAWINGS

The disclosure is described in the following with reference to embodiment examples in conjunction with the figures. In the figures, functionally equivalent components are identified with the same respective reference signs. The figures show.

DETAILED DESCRIPTION

Figure 1:
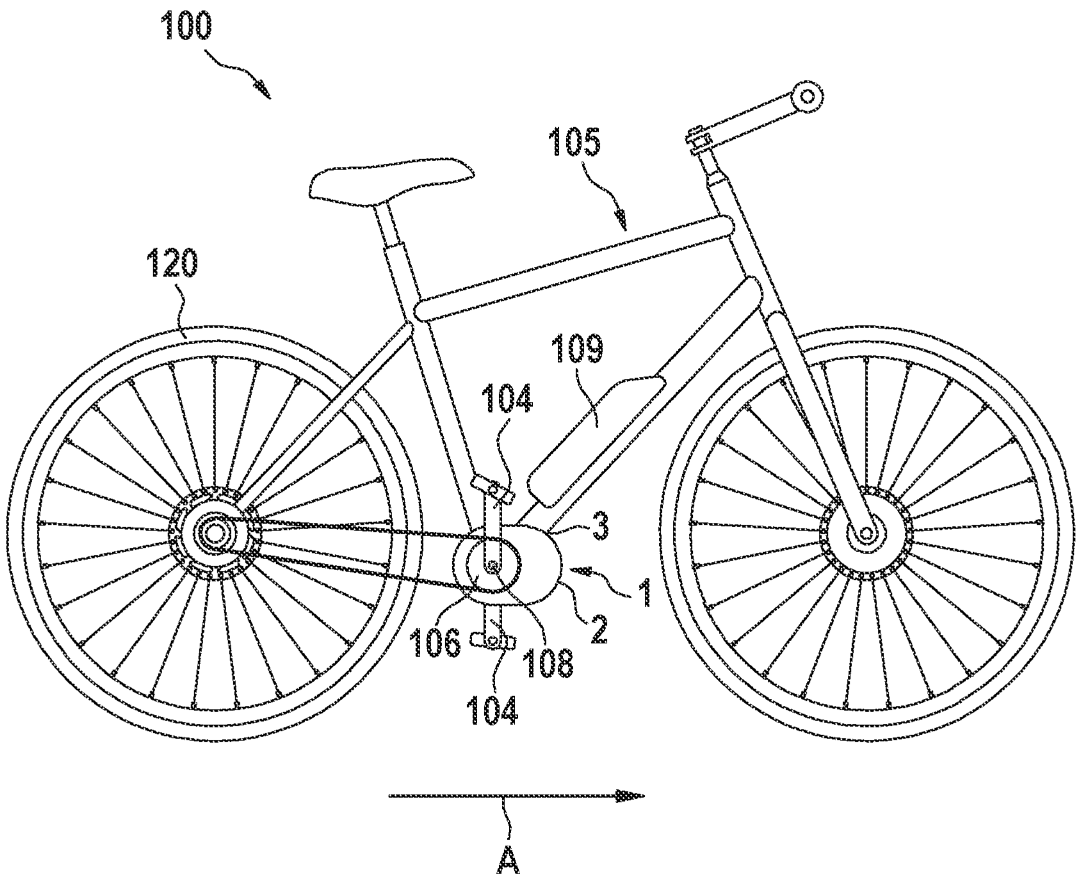
FIG. 1 a simplified schematic view of a vehicle comprising a drive assembly according to a first embodiment example of the disclosure, FIG. 2 a detail of the drive assembly of FIG. 1, FIG. 3 a detail of a drive assembly according to a second embodiment example of the disclosure, FIG. 4 a detail of a drive assembly according to a third embodiment example of the disclosure, FIG. 5 a sectional view of the drive assembly of FIG. 3, FIG. 6 a sectional view of a drive assembly according to a fourth embodiment example of the disclosure, FIG. 7 a sectional view of a drive assembly according to a fifth embodiment example of the disclosure, FIG. 8A a sectional view of the drive assembly of FIGS. 1 and 2 in the fully screwed state, FIG. 8B a sectional view of the drive assembly of FIGS. 1 and 2 before the screwing, FIG. 9 a detail of FIG. 8A, FIG. 10 a perspective detail view of a mounting of the drive assembly of FIG. 8A, FIG. 11 a detail of a drive assembly according to a sixth embodiment example of the disclosure, FIG. 12 a detail sectional view of FIG. 11, FIG. 13 a detail sectional view of a drive assembly according to a seventh embodiment example of the disclosure, FIG. 14 a further detail sectional view of the drive assembly of FIG. 13, FIG. 15 a sectional view of a drive assembly according to an eighth embodiment example of the disclosure, FIG. 16 a sectional view of a drive assembly according to a ninth embodiment example of the disclosure, FIG. 17 a sectional view of a drive assembly according to a tenth embodiment example of the disclosure, and FIG. 18 a sectional view of a drive assembly according to an eleventh embodiment example of the disclosure.

FIG. 1 shows a simplified schematic view of a vehicle 100 which can be operated by means of muscle power and/or motor power and comprises a drive assembly 1 according to a first embodiment example of the disclosure. The vehicle 100 is an electric bicycle. The drive assembly 1 is arranged in the region of a bottom bracket and comprises a drive unit 2.

The drive unit 2 comprises a motor 21, which is an electric motor, and a transmission 23. The drive unit 2 is provided to support the driver's pedal force generated by muscle power by means of a torque generated by the motor 21. The motor 21 of the drive unit 2 is supplied with electrical power by an electrical energy store 109.

Figure 2:
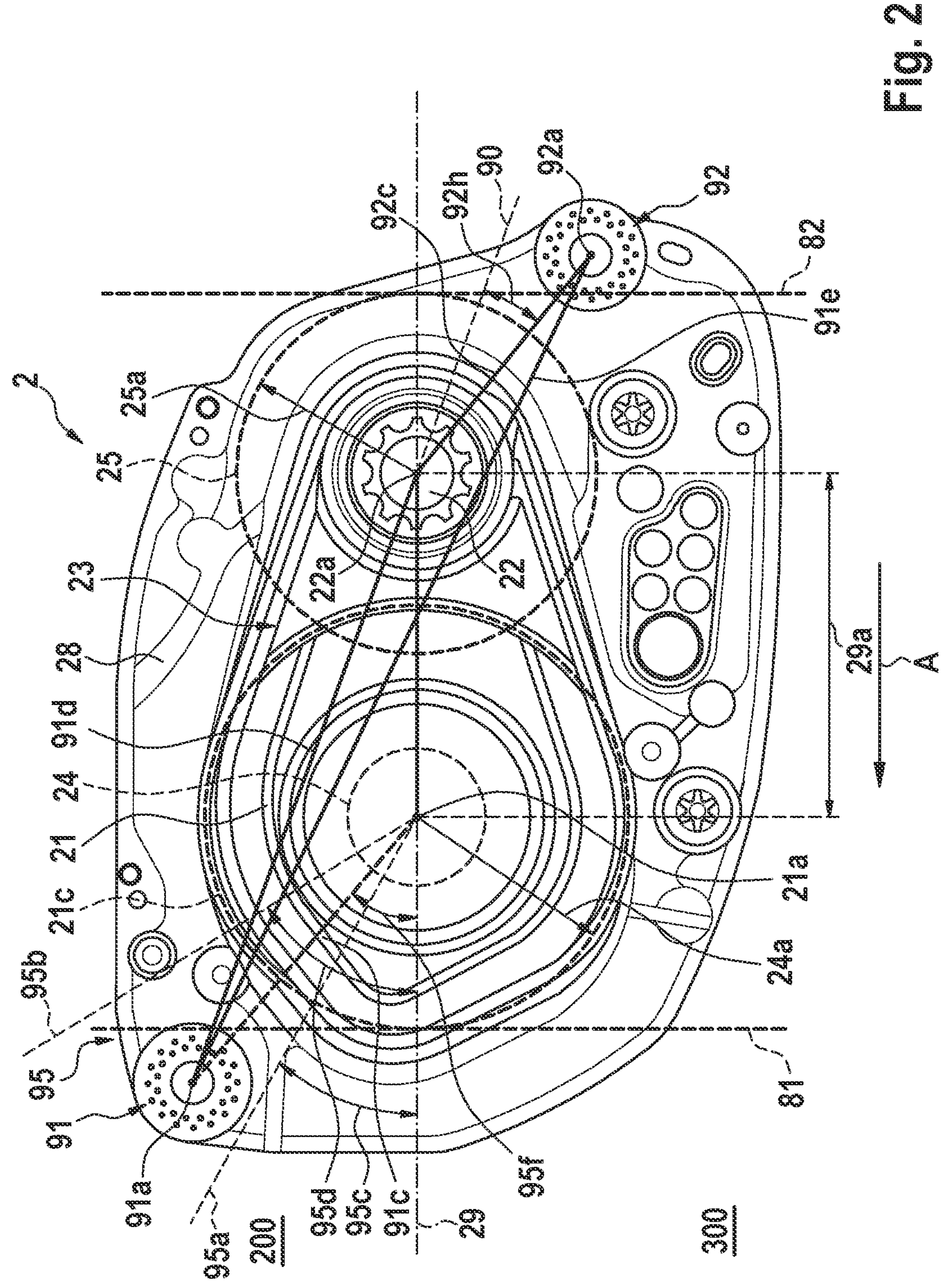

The drive unit 2 is shown enlarged in FIG. 2 in a side view. The drive unit 2 comprises a crankshaft 22 that can be mechanically coupled to pedals 104 of the electric bicycle 100 (cf. FIG. 1). The crankshaft 22 has a crank axis 22*a* about which the crankshaft 22 is rotatable.

The motor 21 (not shown) comprises a stator that is arranged immovably relative to a housing 28 of the drive unit 2 and a rotor that is arranged rotatably within the stator relative to the housing. The rotor is rotatable about a motor axis 21*a* of the motor 21, wherein the motor axis 21*a* and the crank axis 22*a* are parallel to one another.

The transmission 23 comprises a first gear wheel 24 that is rotatable about the motor axis 21*a* and that is preferably connected to the rotor in a torsion-proof manner. Also, the transmission 23 comprises a second gear wheel 25 that rotatable about the crank axis 22*a* and preferably connected to the output shaft 108. Preferably, the transmission 23 comprises at least one other gear wheel (not shown) which mechanically couples the first gear wheel 24 and the second gear wheel 25 to one another. The transmission 23 thus forms a multi-stage transmission that allows a torque transmission between motor 21 and crankshaft 22.

The transmission 23 and the motor 21 are arranged within the housing 28 of the drive unit 2. Preferably, additional components, such as electronics, can be arranged within the housing 28. In particular, the housing 28 serves to protect the components of the drive unit 2 against environmental factors and also serves for mounting and fastening.

The housing 28 comprises a first fastening region 91 and a second fastening region 92 by means of which the drive unit 2 can be fastened to a frame interface 3 of the vehicle 100, in particular by screwing it to the frame interface 3. The fastening regions 91, 92 are in particular configured as through-bores, by means of which, for example, a fastening of the housing 28 and thus the entire drive unit 2 can be carried out by means of bolts and/or screws on the frame interface 3. The exact details of this fastening will be described below.

FIG. 2 shows the drive unit 2 in an orientation as given in the state when fastened to the vehicle 100. The motor 21 lies in the direction of travel A (cf. also FIG. 1) upstream of the crankshaft 22. The motor axis 21*a* and the crank axis 22*a* are substantially at the same vertical height. The first fastening region 91 lies in front of the vehicle in the direction of travel A, wherein the second fastening region 92 lies in the rear of the vehicle 100 in the direction of travel A.

To describe the exact position of the first fastening region 91, a longitudinal axis 29 is defined, which intersects the crank axis 22*a* and the motor axis 21*a*. The longitudinal axis 29 lies in a cutting plane through the drive unit 2, which is orthogonal to the crank axis 22*a*. In addition, in this cutting plane, a first line 81 is defined, which is arranged orthogonally to the longitudinal axis 29 and tangentially on an outer circumference 21*c* of the motor 21.

A first center point 91*a* of the first fastening region 91 is arranged on a side of the first line 81 facing away from the crank axis 22*a*. In other words, the first center point 91*a* lies in front of the first line 81 in the direction of travel A.

The longitudinal axis 29 separates a vehicle-facing region 200 arranged vertically at the top and a region 300 facing away from the vehicle arranged vertically at the bottom. The first center point 91*a* lies in the vehicle-facing region 200.

Furthermore, a fastening sector 95 is defined, which is bounded by two straight lines 95*a*, 95*b*. The two straight lines 95*a*, 9*b* each intersect the motor axis 21*a*. A first angle 95*c* between the first straight line 95*a* and the longitudinal axis 29 is about 30°. A second angle 95*d* between the second straight line 95*b* and the longitudinal axis is about 60°. The first center point 91*a* of the first fastening region 91 lies within the fastening sector 95.

An angle 95*f* between the longitudinal axis 29 and a straight line connecting the first center point 91*a* to the motor axis 21*a* is about 45°.

Furthermore, the first center point 91*a* is arranged at a predetermined first distance 91*c* from the motor axis 21*a*. The first distance 91*c* is about 160% of a maximum radius 24*a* of the motor 21, in particular the stator of the motor 21.

Also, the first center point 91*a* is arranged at a predetermined second distance 91*d* from the crank axis 22*a*. The second distance 91*d* is about 190% of a longitudinal distance 29*a* of the motor axis 21*a* and the crank axis 22*a* from one another.

In the first embodiment shown in FIG. 2, a second center point 92*a* of the second fastening region 92 is arranged in the region 300 facing away from the vehicle.

In the cutting plane through the drive unit 2, a second line 82 is defined, which is also arranged orthogonally to the longitudinal axis 29 and additionally tangentially on an outer circumference of the second gear wheel 25. The second center point 92*a* of the second fastening region 92 is arranged on a side of the second line 82 facing away from the motor axis 22*a*, that is to say in the direction of travel A behind the second line 82.

A fourth angle 92*h* between a fastening axis 90, on which the first center point 91*a* lies and which intersects the crank axis 22*a*, and a connecting line 92*c* of the crank axis 22*a* and the second center point 92*a* is about 20°.

With respect to the fastening axis 90, the second center point 92*a* and the motor axis 21*a* lie in the cutting plane on the same side of the fastening axis 90, namely facing away from the vehicle.

A third distance 91*e* of the first center point 91*a* and second center point 92*a* from one another is about 140% of the second distance 91*d* of the first center point 91*a* from the crank axis 22*a*. In particular, the third distance 91*e* is significantly greater than, and is preferably at least twice, an axis distance 29*a* of the two axes 21*a*, 22*a* from one another.

Furthermore, a fourth distance 92*c* of the second center point 92*a* from the crank axis 22*a* is about 170% of a maximum radius of the second gear wheel 25.

The specific arrangement of the fastening regions 91, 92 offers numerous advantages. In particular, an advantageous mechanical fastening is made possible with simultaneous compactness and possibility of weight savings. Due to the arrangement of the first fastening region 91 on the side of the first line 81 facing away from the crank axis 22*a*, there is a large distance between the first fastening region 91 and the crank axis 22*a*. Thus, there is a large lever arm between these two points. As a result, forces introduced at the crankshaft 22*a* into the drive unit 2 can thereby be optimally absorbed on a frame interface 3 or by the frame interface 3, in particular due to pedal actuation of a driver of the vehicle 100. At the same time, a large distance between the two fastening regions 91, 92, which in particular exploits a maximum length of the entire drive unit 2 as much as possible, results in a broad or wide support of the mechanical forces that occur by means of the two fastening regions 91, 92.

In particular, the two fastening regions 91, 92 together with the crankshaft 22 form a triangular force at which corners engage the relevant forces occurring during operation of the drive unit 2. The specific bearing of the fastening regions 91, 92 results in optimal lever ratios in order to be able to distribute or absorb the forces occurring during operation. Due to the wide support, the forces acting on the two fastening regions in the 91, 92 can be optimally introduced into the frame interface 3 without, for example, high stresses, which require increased dimensions of wall thicknesses or the like, which would lead to an unnecessarily high cost of material and weight. Particularly advantageously, in the specific arrangement of the fastening regions 91, 92, there is a resulting force introduction point of a chain force when pedaling between the two fastening regions 91, 92. A particularly uniform support can thus take place.

Due to the specific position and relative arrangement of the two fastening regions 91, 92, an advantageous geometry of the drive unit 2 is also provided. In particular, the housing 28 has a flat and elongated geometry, that is to say a vertically low design height and a horizontally greater length. For example, the further advantage can be achieved by allowing greater ground clearance in the region of the bottom bracket of the vehicle 100.

Figure 4:
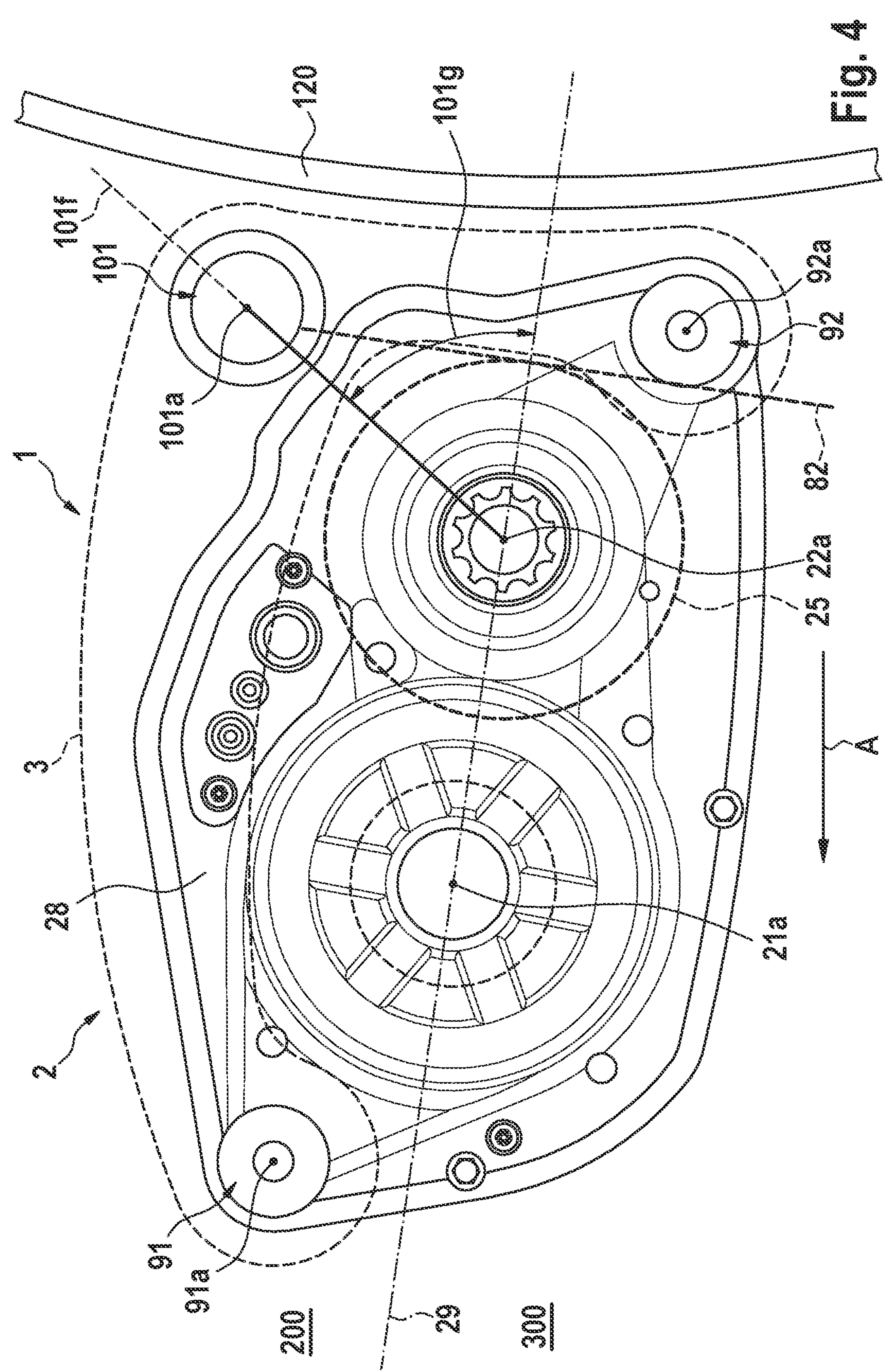

Furthermore, the configuration shown in FIG. 2 allows for an optimum attachment of an articulation region 101 of a fully suspended bicycle, as can be seen for example in FIG. 4.

FIG. 4 shows a detail of a drive assembly 1 according to a third embodiment example of the disclosure. The third embodiment example substantially corresponds to the first embodiment example of FIGS. 1 and 2, in particular with an identical geometrical configuration of the drive unit 2, wherein the frame interface 3 and the vehicle 100 are alternatively configured. In FIG. 4, the frame interface 3 is indicated by a dashed line. In detail, the vehicle 100 is a fully suspended electric bicycle. In the frame interface 3, a bore is provided in the frame interface 3 as an articulation region 101, which is configured so as to receive a main bearing for bearing a backing structure of the vehicle 100.

The articulated region 101 is arranged in the vehicle-facing region 200. A center point 101*a* of the articulation region 101 lies approximately on the second line 82. Furthermore, the center point 101*a* can preferably be on a line 101*f* that intersects the crank axis 22*a* and is arranged at an angle 101*g* of about 55° to the longitudinal axis 29.

Due to the fact that the second fastening region 92 is arranged below, there is a particularly large amount of space available at the top of the vehicle-facing region 200 and in the region of the second line 82 in order to be able to optimally arrange the articulation region 101. In particular, the articulated region 101 can be arranged as close as possible to the crank axis 22*a*, which has a particularly advantageous effect on a backing structure kinematics of the fully suspended electric bicycle, in particular by keeping a chain stay short as a result.

Figure 3:
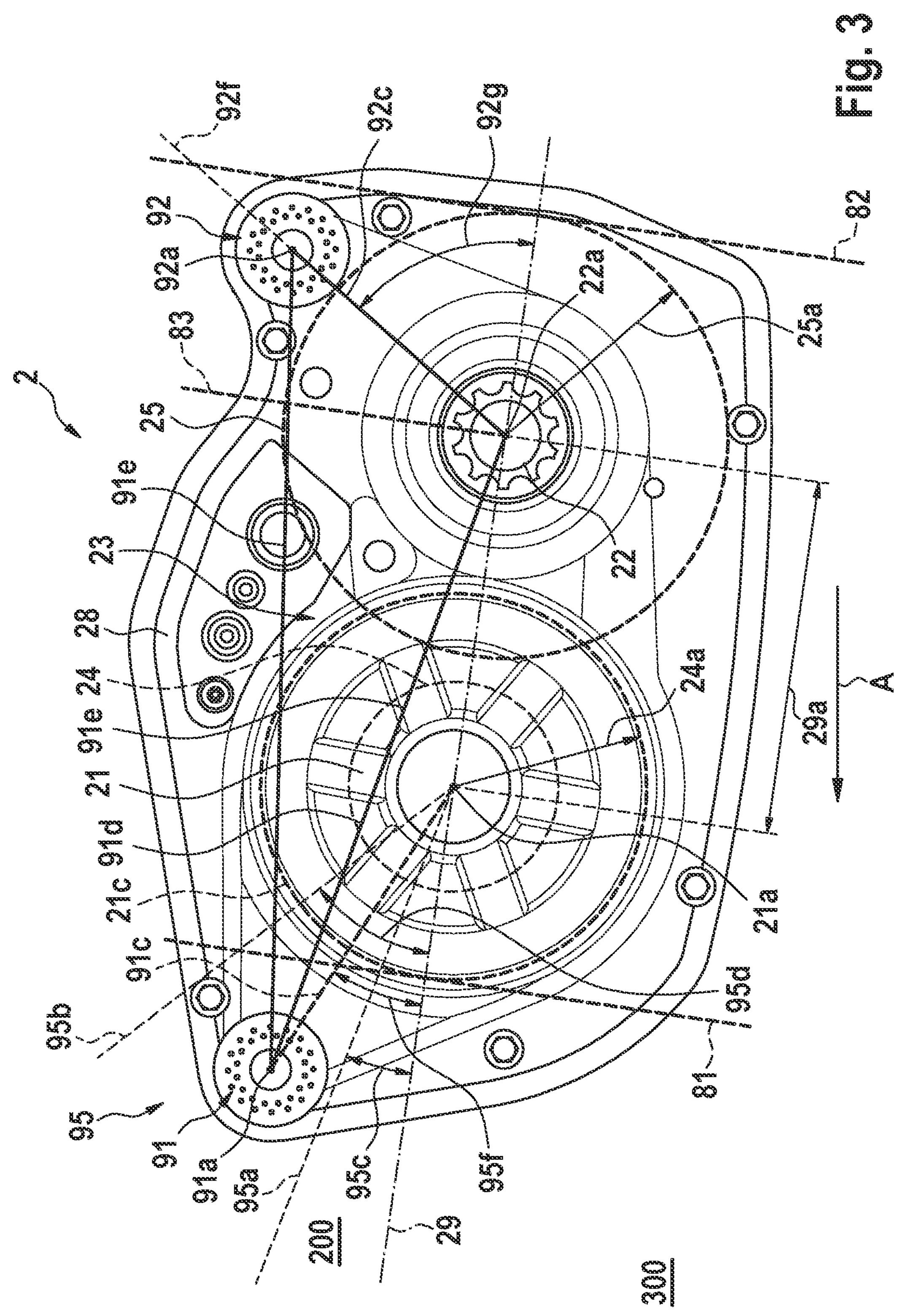

FIG. 3 shows a detail sectional view of a drive assembly 1 according to a second embodiment example of the disclosure. The fifth embodiment example substantially corresponds to the second embodiment example of FIGS. 1 and 2, with the difference of an alternative configuration of the second fastening region 92.

In the second embodiment of FIG. 3, the second fastening region 92 is arranged in the vehicle-facing region 200. Also, the second fastening region 92 is arranged within the second line 82, that is to say on the side of the second line 82 facing the motor axis 21*a*.

Additionally, a third line 83 is defined, which is orthogonal to the longitudinal axis 29 and which intersects the crank axis 22*a*. The second center point 92*a* of the second fastening region 92 is arranged between the second line and the third line 83.

Furthermore, a third straight line 92*f* is defined, which intersects the crank axis 22*a* and on which the second center point 92*a* lies. Here, a third angle 92*g* between the third straight line 92*f* and the longitudinal axis 29 is about 55°. For example, the fourth distance 92*c* can be reduced to a minimum such that the second connection region 92 radially outward directly abuts the second gear wheel 25.

The third distance 91*e* of the first center point 91*a* and the second center point 92*a* from one another is selected at a maximum in the longitudinal direction while maintaining a drive unit 2 as compact as possible. In particular, the third distance 91*e* is also significantly greater than, and is preferably at least twice, the axis distance 29*a* of the two axes 21*a*, 22*a* from one another.

Thus, an alternative configuration of the drive unit 2 can be provided, which, on the one hand, allows for an optimal mechanical support and fastening to the frame interface 3 through the widely distanced and optimally arranged fastening regions 91, 92, and on the other hand, ensures as compact a drive unit 2 as possible.

Figure 5:
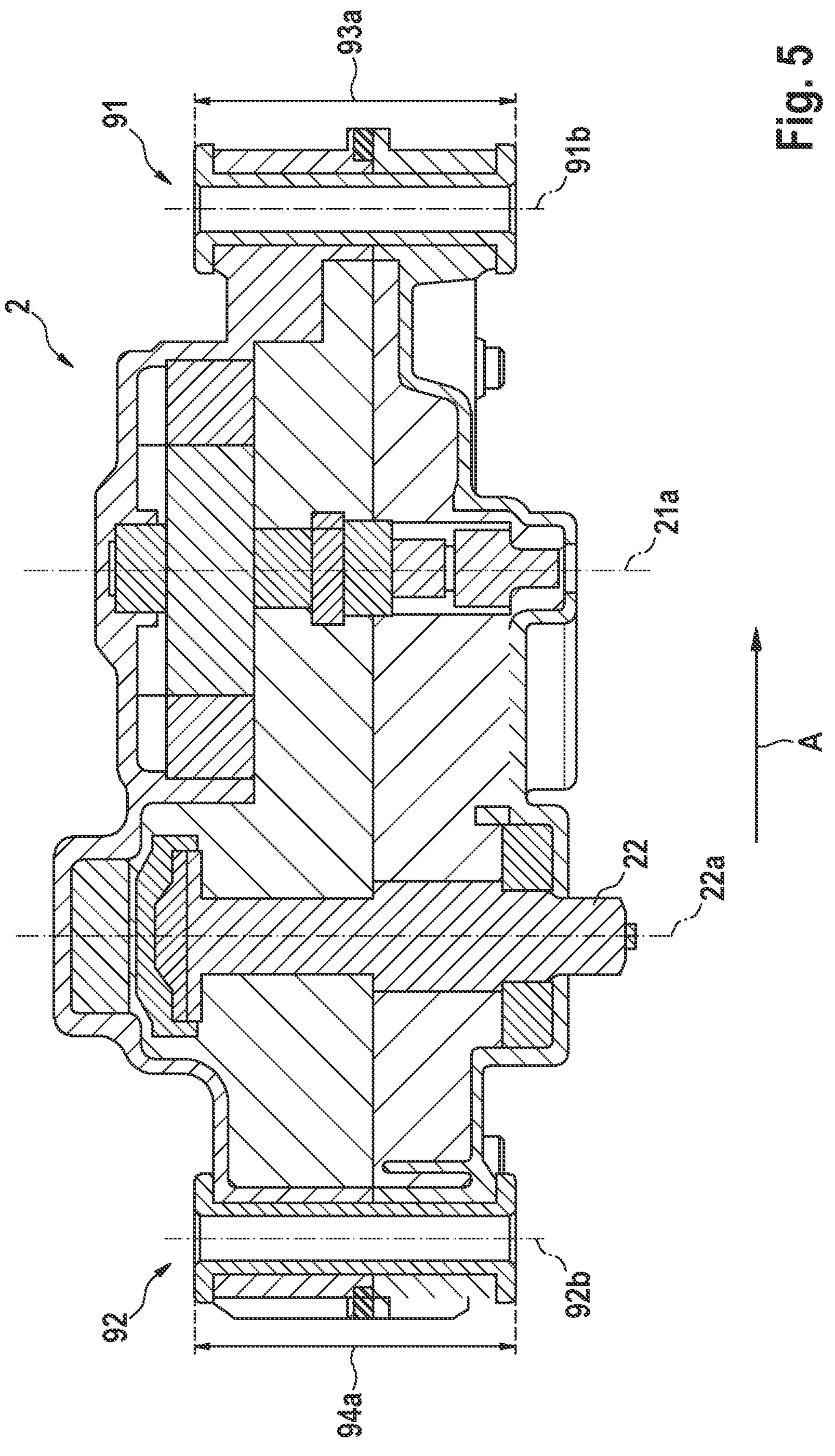
Figure 6:
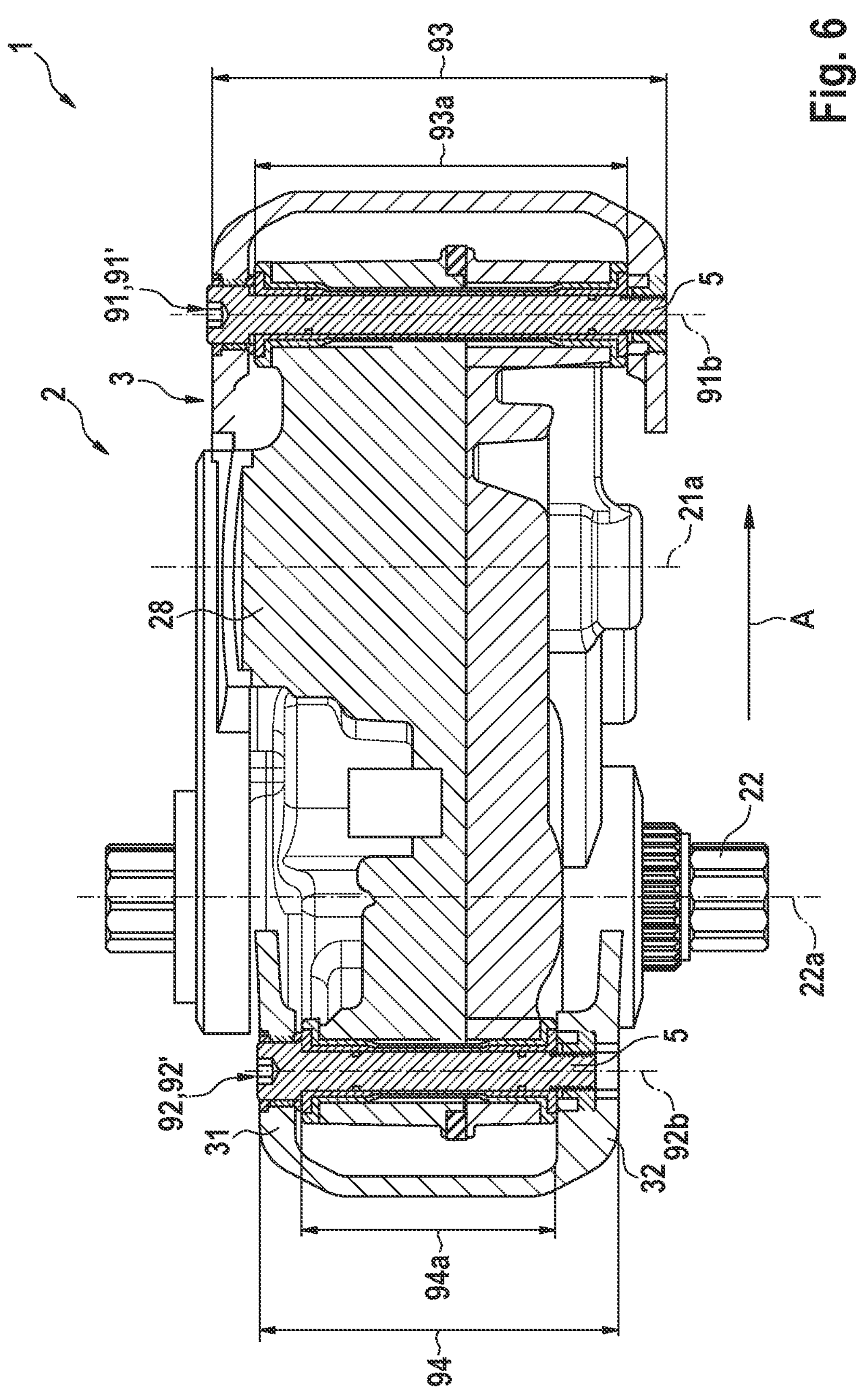
Figure 7:
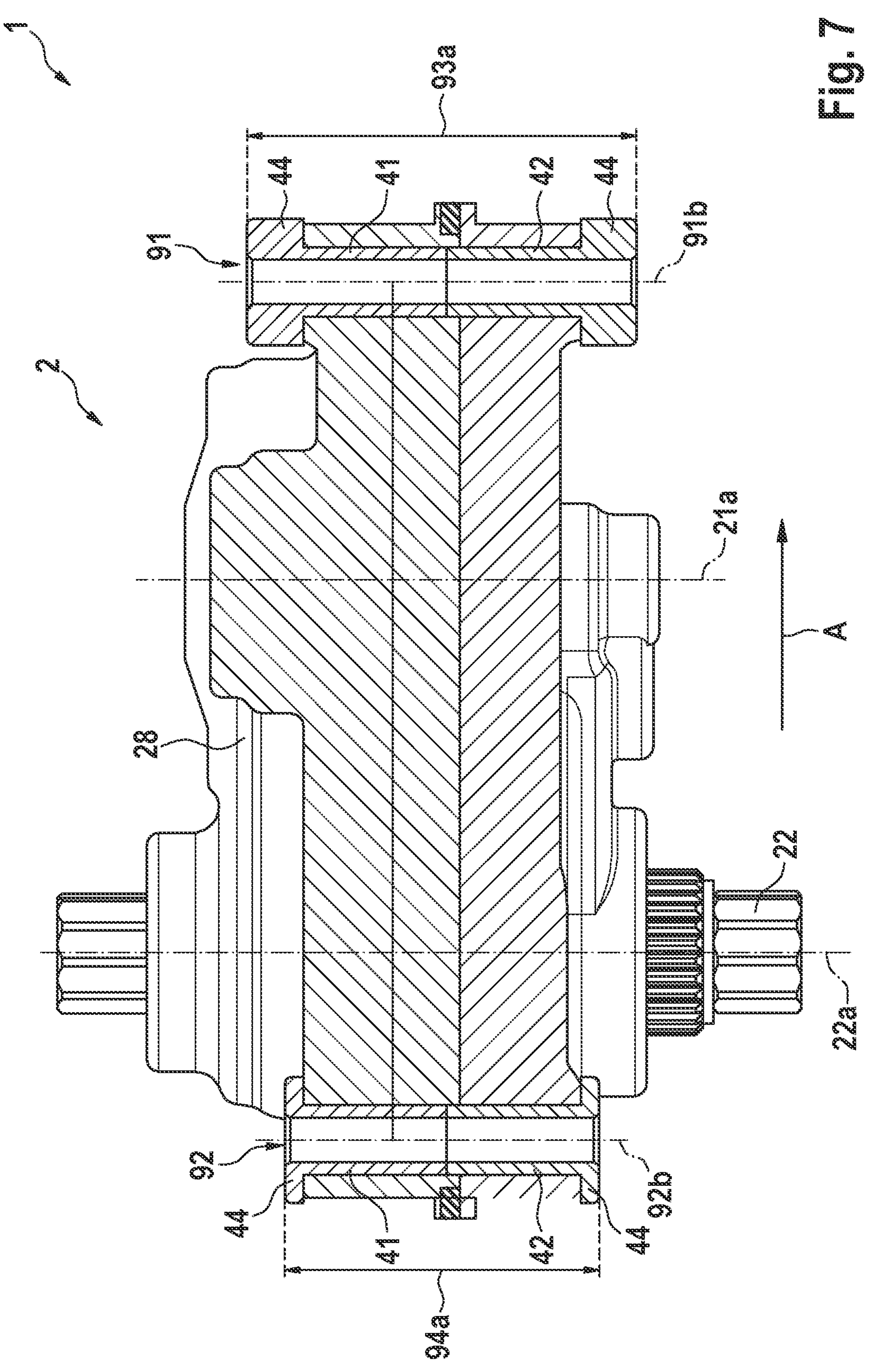

With reference to FIGS. 5 to 7, embodiment examples are described below, which are respective sectional views in an alternative cutting plane in which corresponding fastening axes 91*b*, 92*b* of the fastening regions 91, 92 lie.

FIG. 5 shows a sectional view of the drive unit 2 of FIG. 3. As can be seen in FIG. 3, at each of the fastening regions 91, 92, the drive unit 2 has a maximum width 93*a*, 94*a* along a corresponding direction of the fastening axis 91*b*, 92*b*. The maximum width 93*a*, 94*a* is identical at both fastening regions 91, 92.

FIG. 6 shows a sectional view of a drive assembly 1 according to a fourth embodiment example of the disclosure. The fourth embodiment example substantially corresponds to the second embodiment example of FIGS. 3 and 5, with the difference that different widths are provided at the two fastening regions 91, 92. In detail, the maximum width 93 of the frame interface 3 at a first fastening region 91' to which the first fastening region 91 is fastened is greater than the maximum width 94 at a second fastening region 92' to which the second fastening region 92 is fastened. The first connection region 91' in the direction of travel A lies in front of the second connection region 92'. Thus, a particularly robust construction can be carried out by a particularly stable support at the first fastening region 91'. This has the further advantage that the frame interface 3 can be designed particularly wide and having a large volume in the region of the first connection region 91', which can simplify the installation of a larger energy store 109, for example.

In the fourth embodiment of FIG. 6, the housing 28 of the drive unit 2 has maximum widths 93*a*, 94*a* adjusted to the widths 93, 94 at the fastening regions 91, 92, respectively.

FIG. 7 shows a sectional view of a drive unit 2 of a drive assembly 1 according to a fifth embodiment example of the disclosure. The fifth embodiment example substantially corresponds to the fourth embodiment example of FIG. 6, with the difference that the housing 28 of the drive unit 2 is equal in width at both fastening regions 91, 92. For example, the drive unit 2 of FIG. 7 can correspond to the drive unit of FIG. 5.

In the fifth embodiment of FIG. 7, different sleeves 41, 42 are used in order to provide different maximum widths 93*a*, 94*a* of the drive unit 2 at the two fastening regions 91, 92. In detail, sleeves 41, 42 are used at the first fastening region 91, which have thicker flanges 44 compared to the sleeves 41, 42 at the second fastening region 92. The drive unit 2 can thus be adapted to the frame interface 3 with different widths 93, 94 in a particularly simple and cost-efficient manner.

The exact description of the screwing of the drive unit 2 to the frame interface 3 of the vehicle 100 is provided below.

Figure 8A:
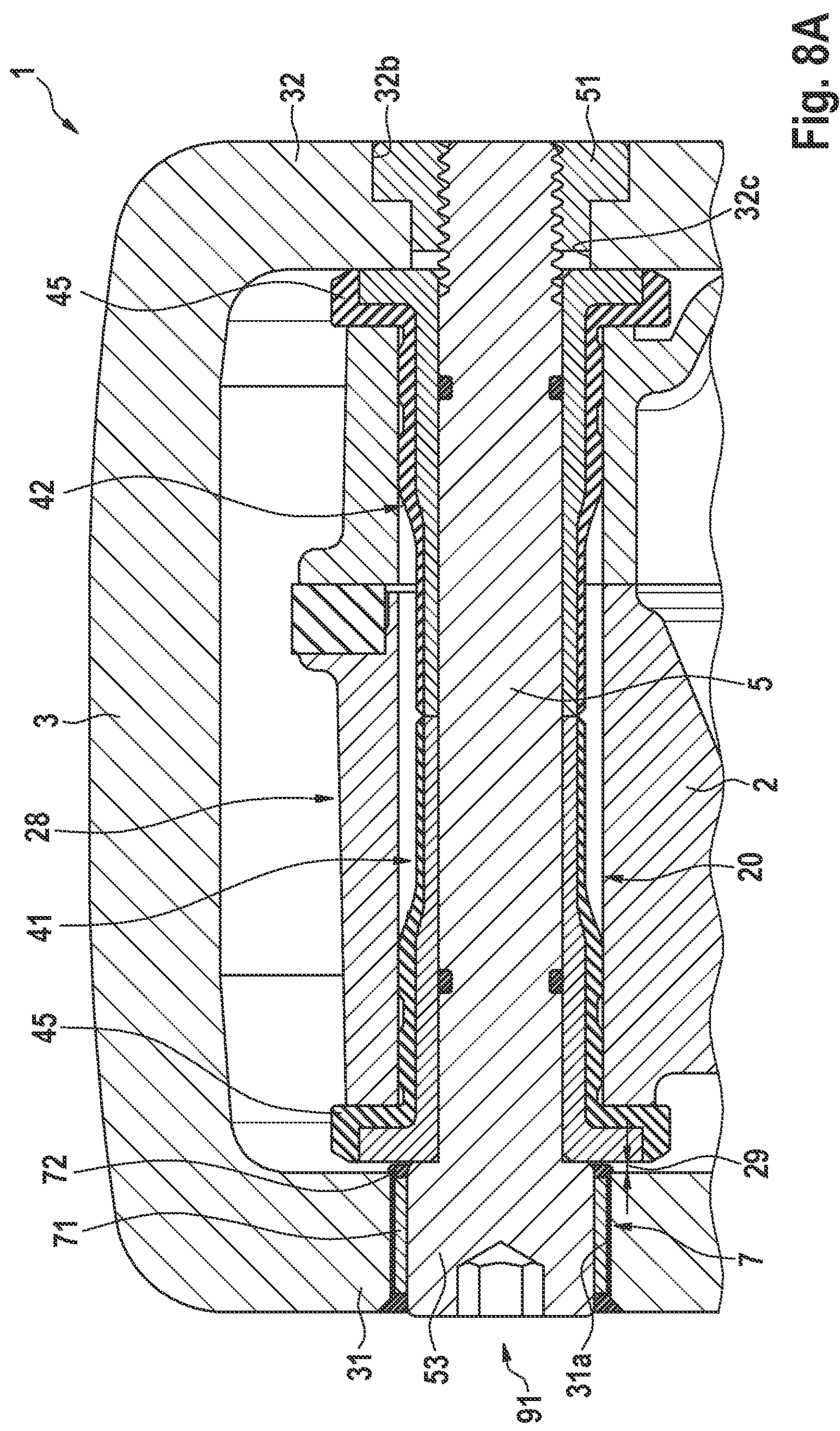

The drive assembly 1 of the first embodiment example is shown in a sectional view in FIG. 8A. The drive assembly 1 comprises a U-shaped frame interface 3, inside which the drive unit 2 is partly accommodated. The frame interface 3 is an integral part of a vehicle frame 105 of the vehicle 100 (see FIG. 1). The frame interface 3 comprises a first wall 31 and a second wall 32, between which the drive unit 2 is arranged. The first wall 31 and the second wall 32 are connected to one another via a connecting wall 33 and are thus configured as a one-piece component.

The drive unit 2 is fastened to the frame interface 3 by means of a through-bolt connection, as described in further detail below.

In detail, the drive unit 2 comprises a through-bore 20 that passes all the way through the drive unit 2 in transverse direction. The through-bore 20 is in particular configured in the housing 28, which is preferably made of aluminum or magnesium, of the drive unit 2. The housing 28 of the drive unit 2 can be configured in two parts, wherein a housing seal 2*c* arranged between the two housing halves 2*a*, 2*b*.

Two sleeves 41, 42 are inserted into the through-bore 20. The two sleeves 41, 42 are each inserted into the through-bore 20 from a respective side, i.e. at an axial end of the through-bore 20. The sleeves 41, 42 are preferably made of aluminum or steel.

Each sleeve 41, 42 comprises a shank 43, which is substantially hollow cylindrical and is inserted into the through-bore 20, and a flange 44. The flange 44 is arranged outside the through-bore 20 and has a larger outer diameter than the shank 43.

The shank 43 comprises a press region 43*a*, which is arranged directly adjacent to the flange 44. The press region 43*a* is designed such that a press fit is formed between the press region 43*a* and the through-bore 20.

Formed centrally in the through-bore 20 is a taper region 20*a*, in which an inner diameter of the through-bore 20 is tapered. Between the taper region 20*a* and the sleeves 41, 42, a clearance fit is preferably formed. As a result, the taper region 20*a* can bring about a centering of the sleeves 41, 42 and thus a simple and precise assembly of the sleeves 41, 42. However, preferably a fit with a large amount of play is provided in this case in order to allow some tilting movement of the sleeves 41, 42 within the through-bore 20 in order to ensure reliable acoustic decoupling, for example during a bicycle saddling.

Preferably, the two sleeves 41, 42 are identical for a simple and cost-effective production.

Axial lengths of the sleeves 41, 42, in particular of the shank 43 in each case, are designed in such a way that the sleeves 41, 42 contact one another within the through-bore 20 in the inserted and fully screwed state (as described later).

Moreover, the drive assembly 1 comprises a through-bolt 5, which is inserted through the through-bore 20 and the two sleeves 41, 42. The through-bolt 5 is configured as a screw and comprises a bolt head 53 at one axial end and an external thread 54 at the other axial end, wherein the external thread 54 extends only over a portion of the through-bolt 5.

By means of the external thread 54, the through-bolt 5 is screwed into a nut 51 on the second wall 32 of the frame interface 3. The bolt head 53 is located on the side of the first wall 31, and in particular rests against an outside of the first wall 31.

Preferably, a clearance fit is respectively formed between the through-bolt 5 and an inner through-opening of the sleeves 41, 42 in order to enable simple insertion. At the regions of the through-bolt 5, within each sleeve 41, 42, a seal, for example an O-ring seal 56, is preferably respectively arranged between the through-bolt 5 and the sleeve 41 or 42 in order to avoid ingress of fluid into the interior of the sleeves 41, 42 and into the interior of the through-bore 20.

The through-bolt 5 is screwed in such a way that it clamps the two sleeves 41, 42 in the axial direction of the through-bolt 5 against the second wall 32. The sleeves 41, 42 ensure that this clamping does not lead to any or to an exactly defined compressive load of the drive unit 2 in the axial direction between the flanges 44 of the two sleeves 41, 42. In particular, with the through-bore screw connection by means of the through-bolt 5, a tensile load on the drive unit 2 is avoided.

The specific through-screw connection of the drive assembly 1 offers numerous advantages. For example, the use of the through-bolt 5 allows for a particularly robust fastening of the drive unit 2. In particular, a screwing process with high torque can take place. By absorbing high compressive forces by means of the sleeves 41, 42, impermissibly high mechanical stress on the drive unit 2 is particularly reliably avoided. Moreover, by adapting the sleeves 41, 42, for example, a tolerance situation of the drive assembly 1 can be simply and cost-effectively adjusted in a defined manner. The through-bolt connection also allows a particularly simple assembly of the drive assembly 1, because the through-bolt 5 can only be inserted, and the through-bolt 5 can only be worked to screw it in, from one side, namely from the side of the first wall 31. This is in particular advantageous in the case of limited accessibility on the side of the second wall 32, for example, if there is a chainring 106 on this side (cf. FIG. 1).

Additionally, each sleeve 41, 42 comprises a damping element 45 formed from an elastic and vibration-damping material. In particular, the damping element 45 is formed from an elastomer. In detail, a respective radially outer outside of the shank 43, the flange 44, and the side of the flange 44 that faces the drive unit 2, is covered or coated with the damping element 45. The damping element 45 is thus preferably configured as an overmolding of the sleeve 41, 42.

Figure 8B:
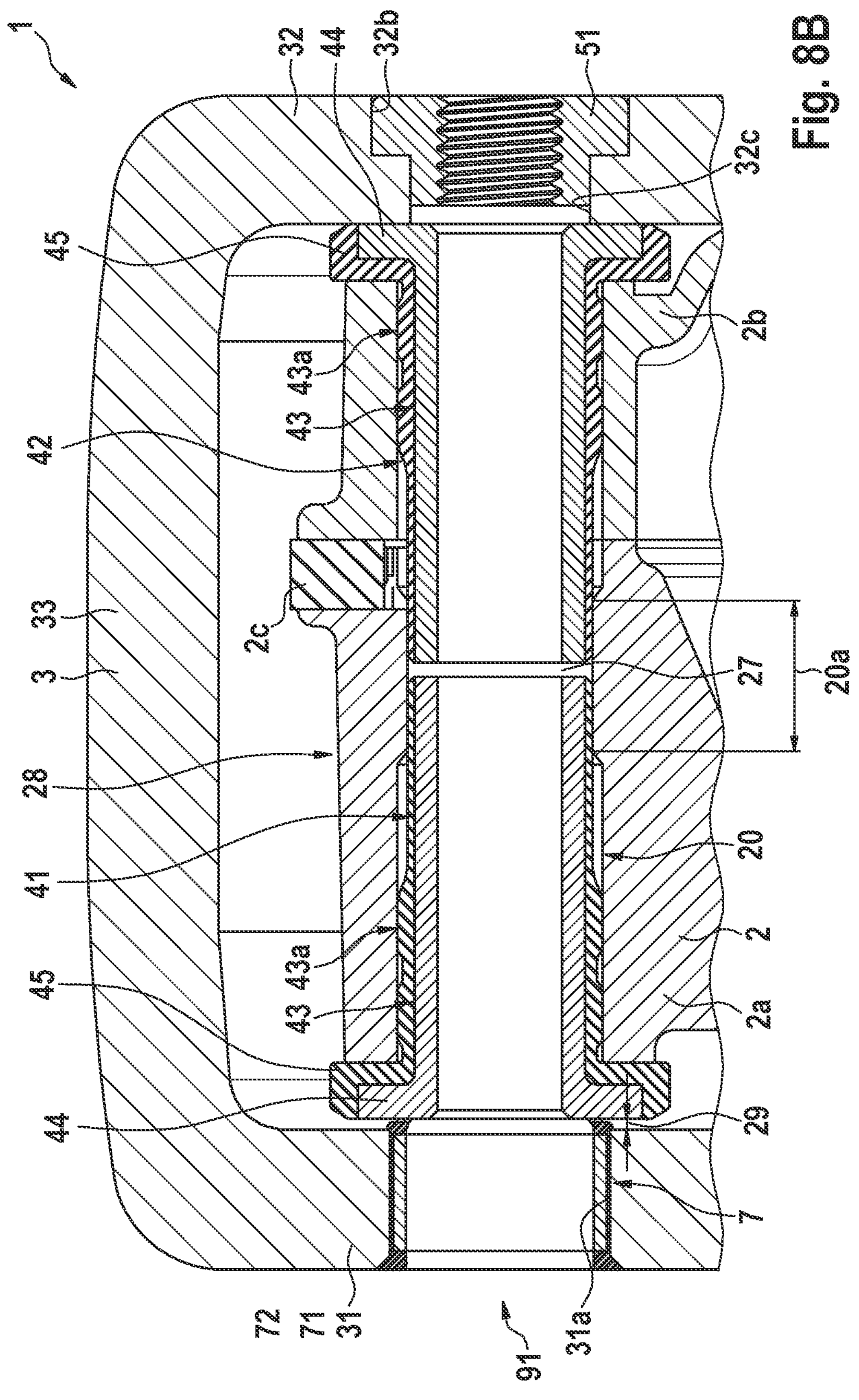

Furthermore, the axial lengths of the shanks 43 of the sleeves 41, 42 are designed in such a way that in the state fully inserted into the through-bore 20 and not yet clamped by the through-bolt 5, as shown in FIG. 8B, there is a predefined axial distance 27, i.e., a gap, between the two sleeves 41, 42 in the interior of the through-bore 20. Considered in this case is a state in which the two sleeves 41, 42 are unclamped but the damping element 45 abuts against the drive unit 2 in the region of each flange 44 of each sleeve 41, 42. In particular, the axial lengths of the two shanks 43 are smaller than half of the axial length of the through-bore 20 by a predetermined difference, wherein the predetermined difference is smaller than double the thickness of one of the damping elements 45 in the region of the flange 44.

In the fully screwed state shown in FIG. 8A, there is a predefined gap 29 between the first wall 31 and the first sleeve 41.

This specific coordination of the lengths of the two sleeves 41, 42 and of the through-bore 20 achieves that the respective part of the damping element 45 of each sleeve 41, 42 that is located between the flange 44 and the drive unit 2 is partially compressed or clamped between the flange 44 and the drive unit 2 by the clamping by means of the through-bolt 5 and thereby elastically deformed.

The damping elements 45 and the corresponding design of the sleeves 41, 42 with axial distance in the unclamped state result in a slight compressive load being exerted on the drive unit 2 in the clamped state. This can advantageously affect a tightness of the drive unit 2 itself. Moreover, the elastic deformation of the damping elements 45 enables a particularly reliable seal between the sleeves 41, 42 and the drive unit 2.

FIG. 1 also shows an output shaft 108, which is rotationally fixedly connected to a chainring 106. The output shaft 108 can be driven via the crankshaft 22 on the one hand by the muscle power of the rider and on the other by the motor power of the drive unit 2. The chainring 106 is located on the side of the second wall 32. As already mentioned above, this results in the advantageous accessibility and simplified assembly of the drive assembly 1. Furthermore, this results in the advantage of direct force transmission between the output shaft 108 and the frame interface 3, which can be particularly well absorbed by the direct and robust connection by means of the second wall 32 due to the higher mechanical forces on the chainring side. Moreover, this ensures a defined position of the chainring 106 relative to an axial direction of the output shaft 108 and relative to the frame interface 3, which provides the advantage of a reliably precisely arranged chainline.

Connecting the drive unit 2 and the frame interface 3 via the damping elements 45 moreover provides the advantage of a vibration-decoupled mounting of the drive unit 2 on the vehicle 100. In addition to preventing or reducing a transmission of acoustic vibrations, which has an advantageous effect on noise reduction during operation of the vehicle 100, a transmission of mechanical vibrations is reduced or prevented as well. A damaging effect of such vibrations on the screw connection can thus be prevented or reduced. This means that loosening or unscrewing of the screw connection can be prevented or reduced. Moreover, as a result of the elasticity of the damping element 45 itself, some tolerance compensation can take place, for example with respect to a coaxiality of the bores or openings, or the like.

Additionally, an axially movable mounting of the through-bolt 5 is provided on the first wall 31. The bolt head 53 of the through-bolt 5 is located within a wall opening 31*a* of the first wall 31. Thus, in case of a particularly stiff and robust frame interface 3, an optimal tolerance compensation can be provided.

The axially movable mounting is achieved by means of a tolerance compensation element 7. This mounting with the tolerance compensation element 7 is shown enlarged in FIG. 9. The tolerance compensation element 7 comprises a hollow cylindrical sliding bearing bushing 71 and a damping shell 72. The damping shell 72 is in particular formed from an elastic material, preferably an elastomer. The damping shell 72 substantially completely surrounds a radially outer side of the sliding bearing bushing 71, wherein recesses (not shown) can also be provided in the damping shell 72, for example. Additionally, the damping shell 72 at least partially covers both axial end faces of the sliding bearing bushing 71. On the radially inner side, the sliding bearing bushing 71 is exposed so that the bolt head 53 can move smoothly with low friction relative to the tolerance compensation element 7.

The sliding bearing bushing 71 can preferably be formed from a solid material along the circumferential direction or can alternatively be slotted, i.e., with a longitudinal slot in the axial direction. In both cases, the sliding bearing bushing 71 is preferably designed in such a way that by screwing-in the through-bolt 5 and thus by the bolt head 53 penetrating into the sliding bearing bushing 71, the sliding bearing bushing 71 is widened in the radial direction so that a press fit is produced between the tolerance compensation element 7 and the wall opening 31*a*. As a result, a mounting of the bolt head 53 in the radial direction without play can be enabled within the wall opening 31*a*.

Figure 9:
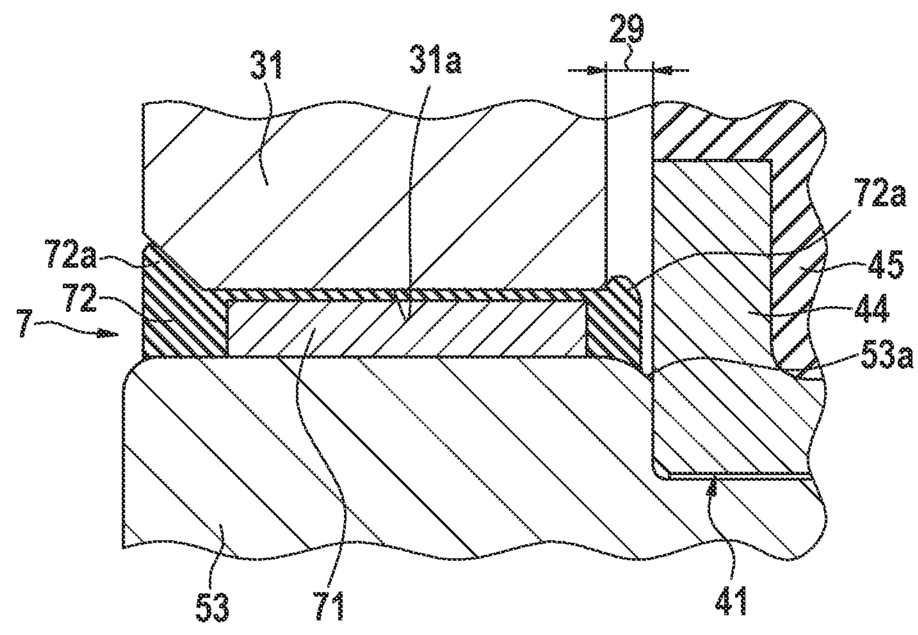

The gap 29 between the first wall 31 and the first sleeve 41 is in this case present both in the unscrewed state and in the fully screwed state (cf. FIGS. 8A and 9).

Preferably, on a side facing the sleeve 41, the bolt head 53 comprises an insertion chamfer 53*a* (cf. FIG. 9), which facilitates the insertion and screwing-in of the through-bolt 5.

At the two axial ends, the damping shell 72 comprises a respective sealing lip 72*a*, which is formed as a lip protruding both radially inward and radially outward. As a result of the elasticity of the damping shell 72, the bolt head 53 pushes the sealing lips 72*a* radially outward as the through-bolt 5 is screwed in. This results in a reliable and defined seal between the first wall 31 and the tolerance compensation element 7 as well as between the bolt head 53 and the tolerance compensation element 7. Furthermore, the sealing lips 72*a* bring about an axial form-fit of the tolerance compensation element 7 with the first wall 31. This ensures reliable and defined assembly of the tolerance compensation element 7 relative to the first wall 31.

Figure 10:
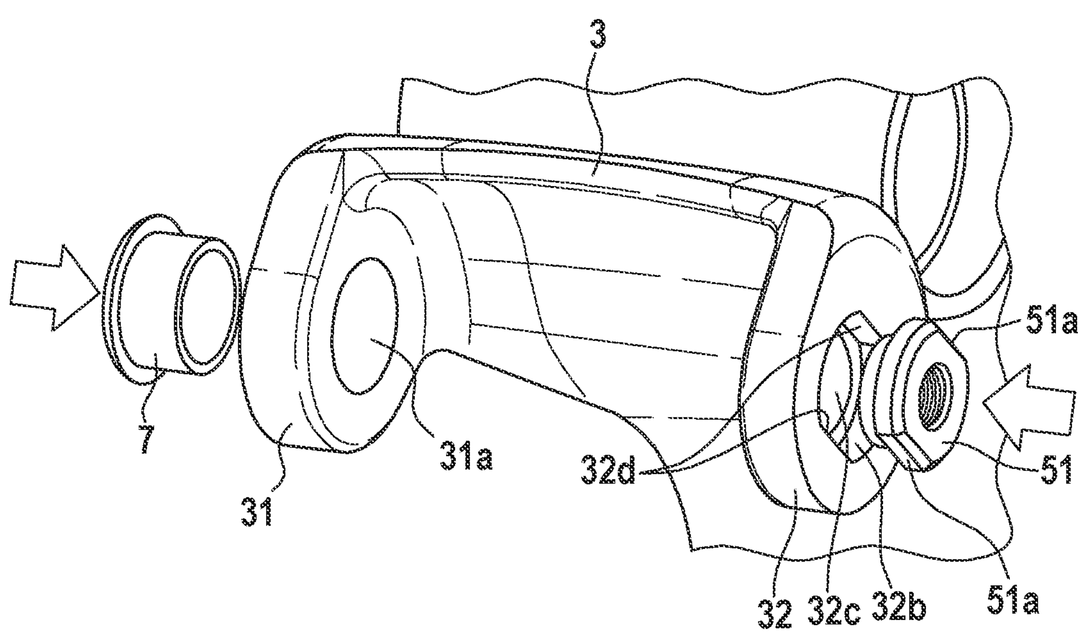

As shown in FIG. 10, prior to arranging the drive unit 2, the tolerance compensation element 7 can preferably be inserted into the wall opening 31*a* of the first wall 31 from outside, i.e., from outside the frame interface 3, in particular be clipped-in by the sealing lips 72*a* by means of a minor form-fit.

Additionally, the screw connection of the through-bolt 5 on the second wall 32 in the first embodiment example is formed by means of a nut 51. The through-bolt 5 is in this case screwed into the nut 51 on the second wall 32. The nut 51 can preferably be formed from steel, as preferably also the through-bolt 5, in order to enable a particularly firm screw connection with high torque.

The nut 51 is arranged in a torsion-proof manner in a recess 32*b* of the second wall 32. Preferably, the recess 32*b* is an external radial expansion of a circular second wall opening 32*c* penetrating through the second wall 32. As can be seen in FIG. 10, the recess 32*b* comprises two opposite flat portions 32*d*, i.e., two straight and parallel walls arranged in the tangential direction. The nut 51 has a corresponding geometry with two opposite flat portions 51*a*. The flat portions 32*d*, 51*a* cause the nut 51 in the second wall 32 to not be able to twist, for example as the through-bolt 5 is screwed in, which enables a particularly simple and fast assembly of the drive assembly 1.

Moreover, the nut 51 is T-shaped in a sectional view. As a result, a maximum thread length can be provided with optimal compactness of the entire drive assembly 1 in order to enable a firm and reliable screw connection with the through-bolt 5.

Figure 11:
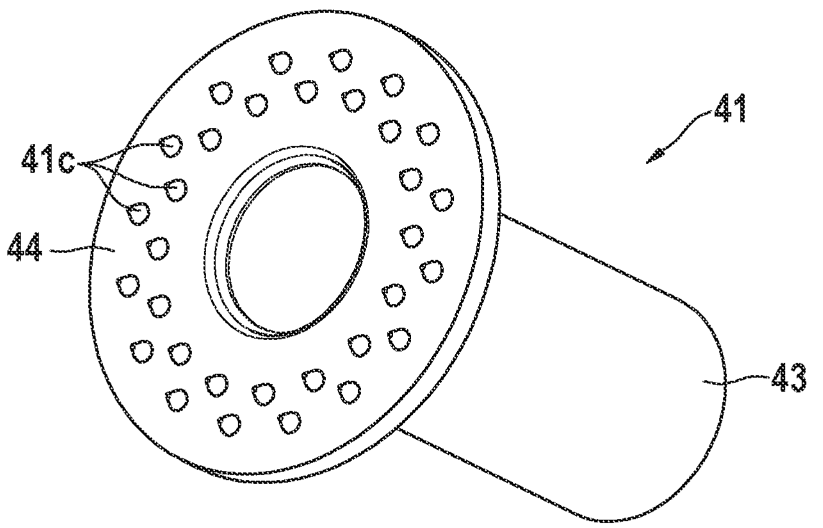

FIG. 11 shows a detail of a drive assembly 1 according to a sixth embodiment example of the disclosure. The sixth embodiment example substantially corresponds to the first embodiment example of FIGS. 1, 2, and 8A to 10, with the difference of an alternative sleeve 41, 42.

Only one of the two sleeves 41, 42 is shown in FIG. 11, wherein the two sleeves 41, 42 are preferably configured identically. The sleeve 41 is shown in a perspective view in FIG. 10.

The sleeve 41 comprises a shank 43 and a flange 44. The shank 43 is inserted into the through-bore 20 of the drive unit 2. The flange 44 is provided for abutment against an inner side of the second wall 32 of the frame interface 3 (cf., e.g., FIG. 8A). The flange 44 of the sleeve 41 comprises a plurality of protruding form-fitting elements 41*c* on the side assigned to the wall 32. Preferably, the form-fitting elements 41*c* are arranged in one or more circles that are concentric with the through-opening of the sleeve 41, preferably in two circles as shown in FIG. 11.

Figure 12:
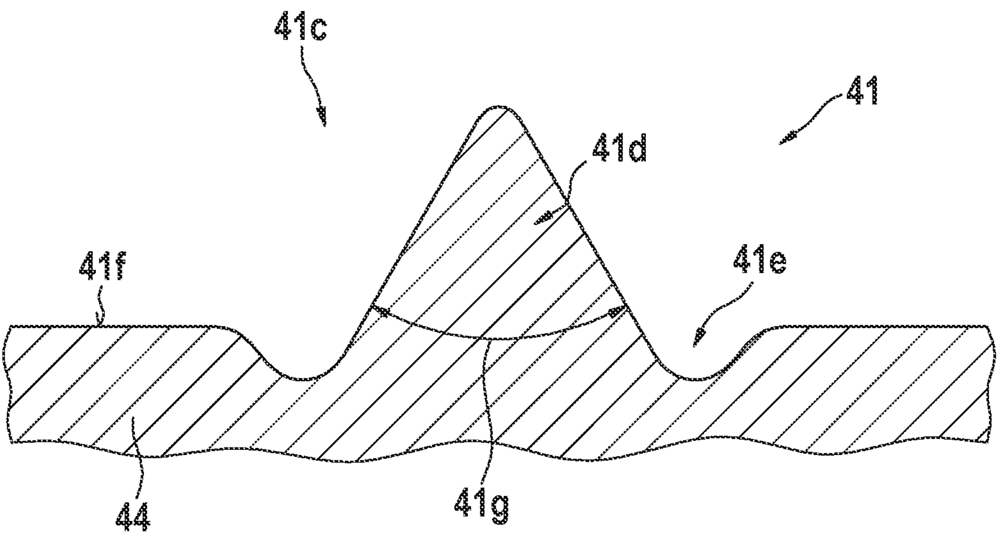

A single form-fitting element 41*c* of the sleeve 41 of FIG. 11 is shown in a detail sectional view in FIG. 12. Each form-fitting element 41*c* comprises a pyramid 41*d* protruding from a surface 41*f* of the flange 44. Alternatively preferably, each form-fitting element 41*c* can also comprise a protruding cone. The pyramid 41*d* is formed as a straight pyramid and has an opening angle 41*k* of preferably less than 60°. In this case, the pyramids 41*d* have the effect that they are pressed into the surface of the wall 32, i.e., plastically deform the wall, as the sleeve 41 is screwed to the wall 32. This produces a micro form-fit between the sleeve 41 and the wall 32 in a plane perpendicular to the screw axis, which can enable a particularly firm connection of the drive unit 2 and the frame interface 3 to one another. Slippage of the drive unit 2 relative to the frame interface 3 can thus be reliably prevented.

In addition to the pyramid 41*d*, each form-fitting element 41*c* comprises a respective recess 41*e*, which is configured on an outer perimeter of the pyramid 41*d* and in the surface 41*f* of the flange 44. The depression 41*e* can, for example, receive material of the wall 32 that is displaced by the penetration of the pyramid 41*d* into the wall 32, so that the wall 32 and the flange 44 can reliably rest precisely planarly on one another. For example, a respective separate depression 51*e* partially or completely surrounding the pyramid 41*d* can be provided per pyramid 41*d*. Alternatively, a single depression 41*e* can preferably be formed in the surface 41*f* of the flange 44, the pyramids 41*d* being arranged on the radial inside and/or outside of said depression.

Figure 13:
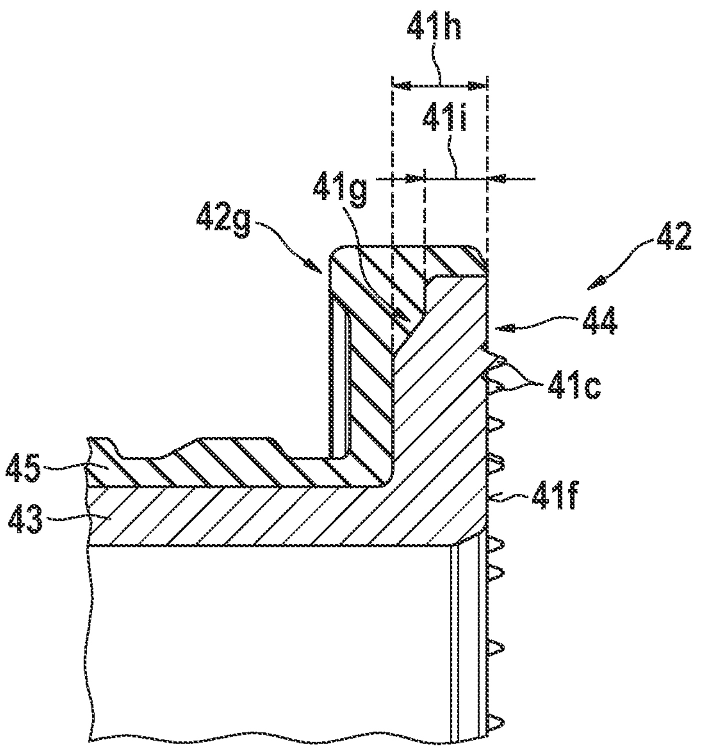

FIG. 13 shows a detail sectional view of a drive assembly 1 according to a seventh embodiment example of the disclosure. In FIG. 13, only one of the two sleeves 41, 42 is shown, namely the sleeve 42 on the side of the second wall 32. Preferably, the first sleeves 41 on the first wall 31 is designed identically. The seventh embodiment example substantially corresponds to the first embodiment example of FIGS. 1, 2 and 8A to 10, with the difference of an alternative design of the sleeve 42 in the region of the flange 44. The sleeve 42 at a radially outer end of the flange 44 comprises a taper 41*g* on the side of the flange 44 facing the shank 43. The taper 41*g* is configured such that a difference between the maximum thickness 41*h* and a minimum thickness 41*i* of the flange 44 corresponds to at least 50%, preferably at most 150%, of a wall thickness 43*h* of the shank 43 of the sleeve 42. The thicknesses along a direction parallel to a longitudinal axis of the sleeve 42 are considered.

The damping element 45 is configured such that it compensates the taper 41*g* of the flange 44. The damping element 45 further comprises a thickening 42*g* at a radially outermost end. There is therefore a particularly thick damping element 42 at the radially outer end of the flange 44. This has an advantageous effect on an optimal seal between the sleeve 42 and the drive unit 2.

Figure 14:
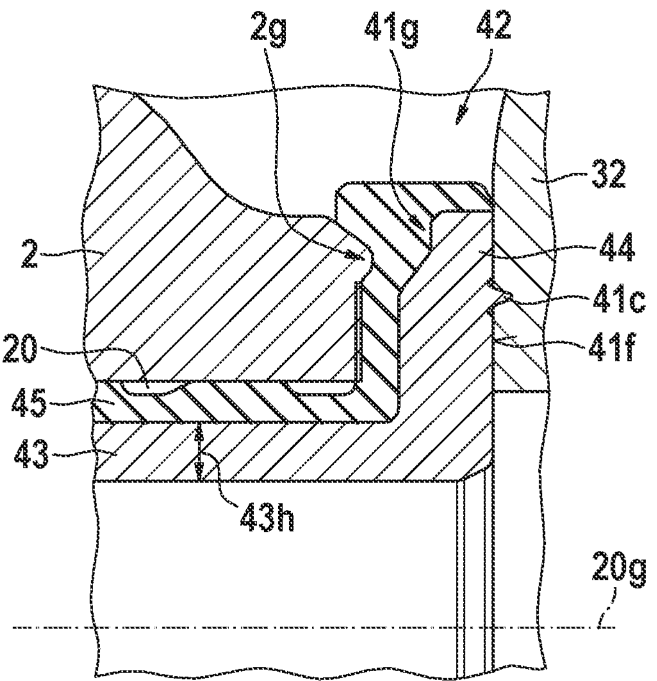

This seal is furthermore supported by a protruding annular rib 2*g* of the drive unit 2, which is provided in the seventh embodiment example as shown in FIG. 14. The protruding annular rib 2*g* has a trapezoidal cross-section and is arranged concentrically with the through-bore 20 of the drive unit 2. In the pressed-in state of the sleeve 42 into the through-bore 20, the protruding annular rib 2*g* and the taper 41*g* of the sleeve 42 are located on the same radius with respect to the drilling axis 20*g* of the through-bore 20. As a result, the protruding annular rib 2*g* dips into the soft zone of the damping element 45 in the region of the taper 41*g* when the sleeve 42 and the drive unit 2 are pressed against one another in the fully screwed state. The elasticity of the damping element 45 thus enables optimal sealing at the drive unit 2.

Figure 15:
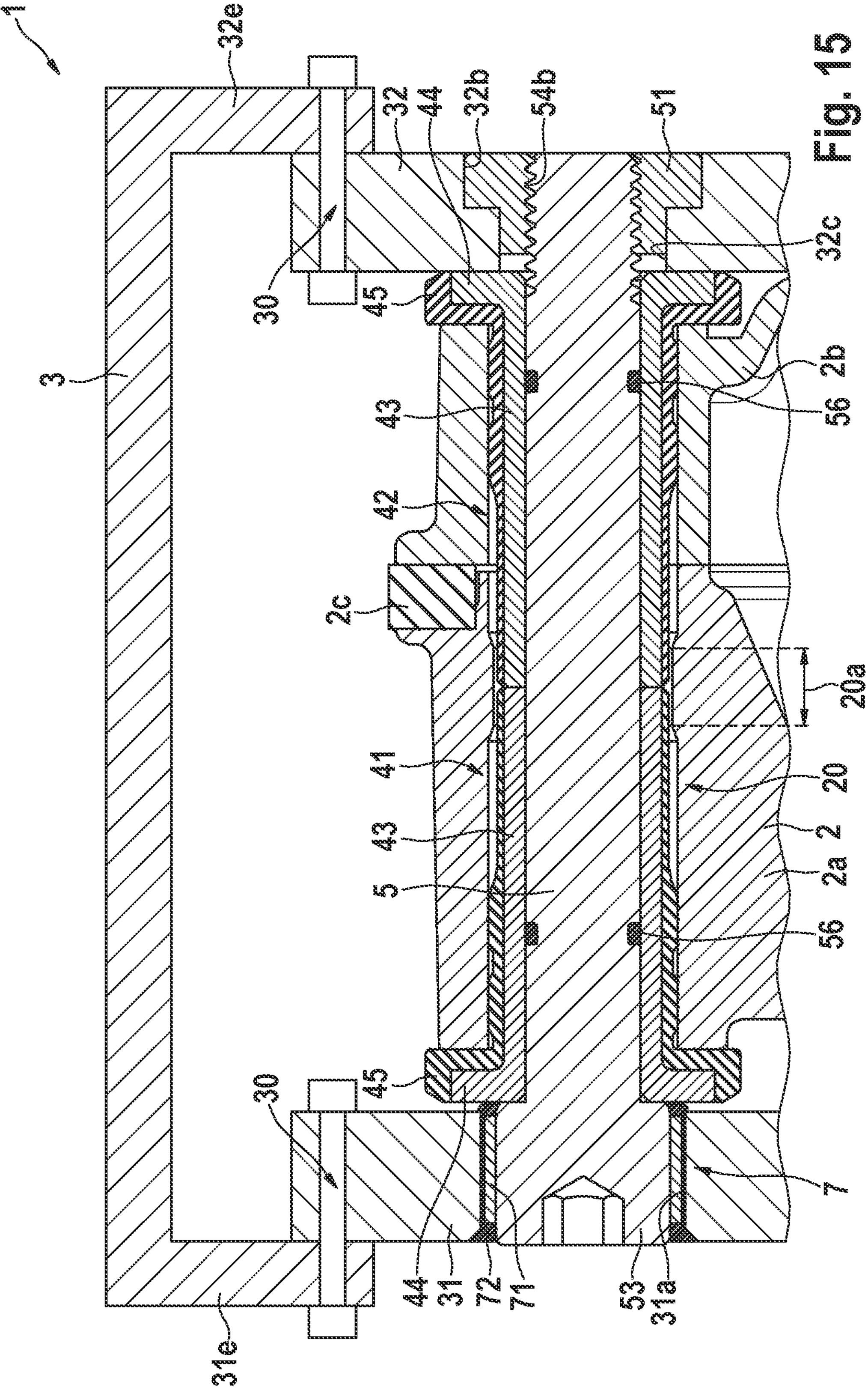

FIG. 15 shows a sectional view of a drive assembly 1 according to an eighth embodiment example of the disclosure. The eighth embodiment example substantially corresponds to the first embodiment example of FIGS. 1, 2 and 8A to 10, with the difference that the drive unit 2 is indirectly screwed to the frame interface 3. Specifically, the two walls 31, 32 to which the drive unit 2 is screwed are designed as separate components from the frame interface 3. The walls 31, 32 can be designed as retaining plates, for example. In this case, the walls 31, 32 can be connected to frame walls 31*e*, 32*e* of the frame interface 3 by means of additional screw connections 30 and/or weld connections (not shown). As a result, a particularly high flexibility of the drive assembly 1 can be provided.

Figure 16:
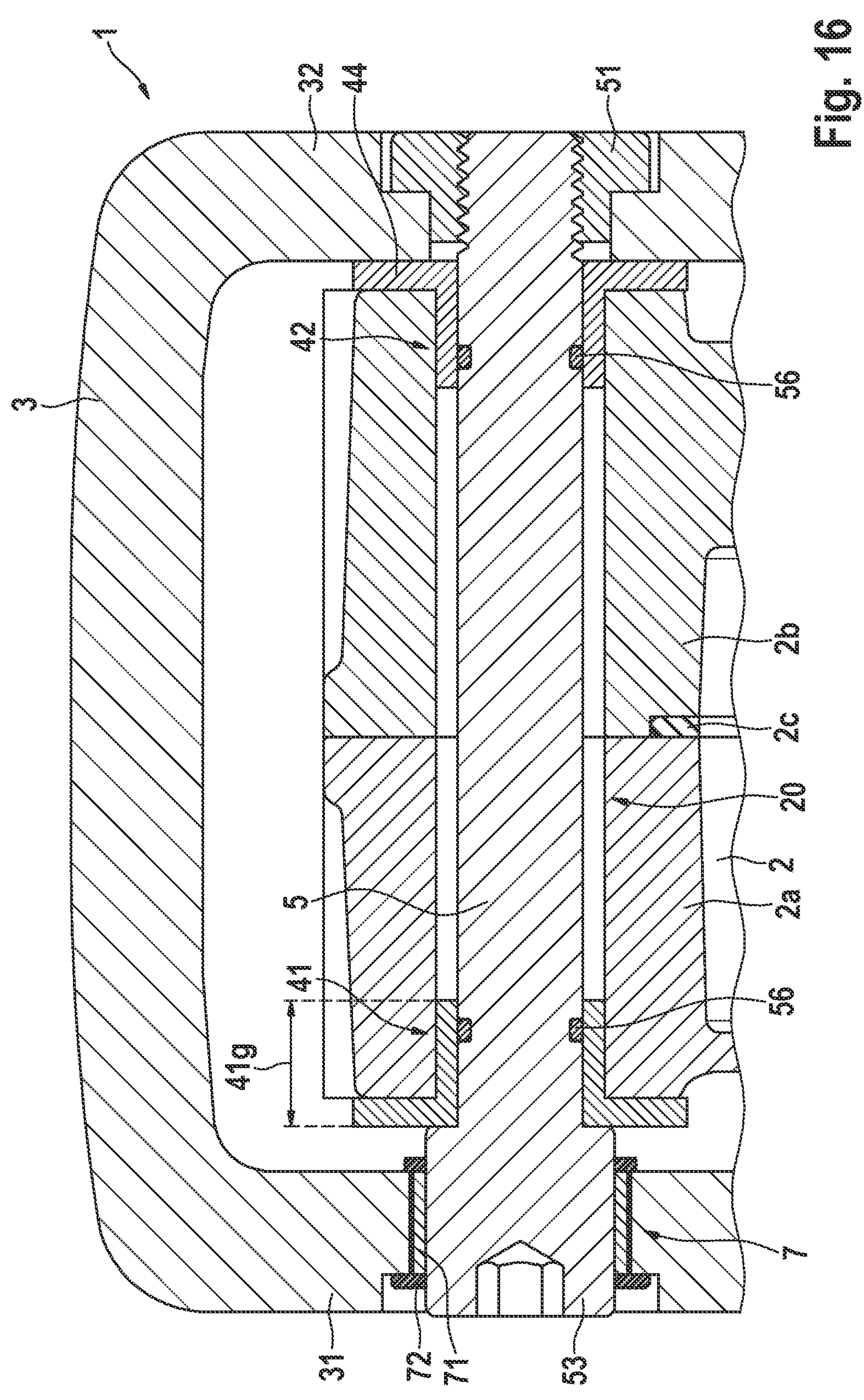

FIG. 16 shows a sectional view of a drive assembly 1 according to a ninth embodiment example of the disclosure. The ninth embodiment example substantially corresponds to the first embodiment example of FIGS. 1, 2 and 8A to 10, with the difference of an alternative design of the sleeves 41, 42. In the ninth embodiment example of FIG. 16, the two sleeves 41, 42 are designed as shortened metal sleeves that particularly simple and cost-effective to produce. The sleeves 41, 42 are designed in such a way that they do not contact one another within the through-bore 20. Moreover, the two sleeves 41, 42 have a short axial length 41*g*, which is, for example, smaller than an inner diameter of the through-bore 20. As a result, material can be saved and simple pressing of the sleeves 41, 42 into the through-bore 20 is also enabled since there is only a small press length. The drive assembly 1 of the ninth embodiment example thus enables a particularly simple and cost-effective construction.

Figure 17:
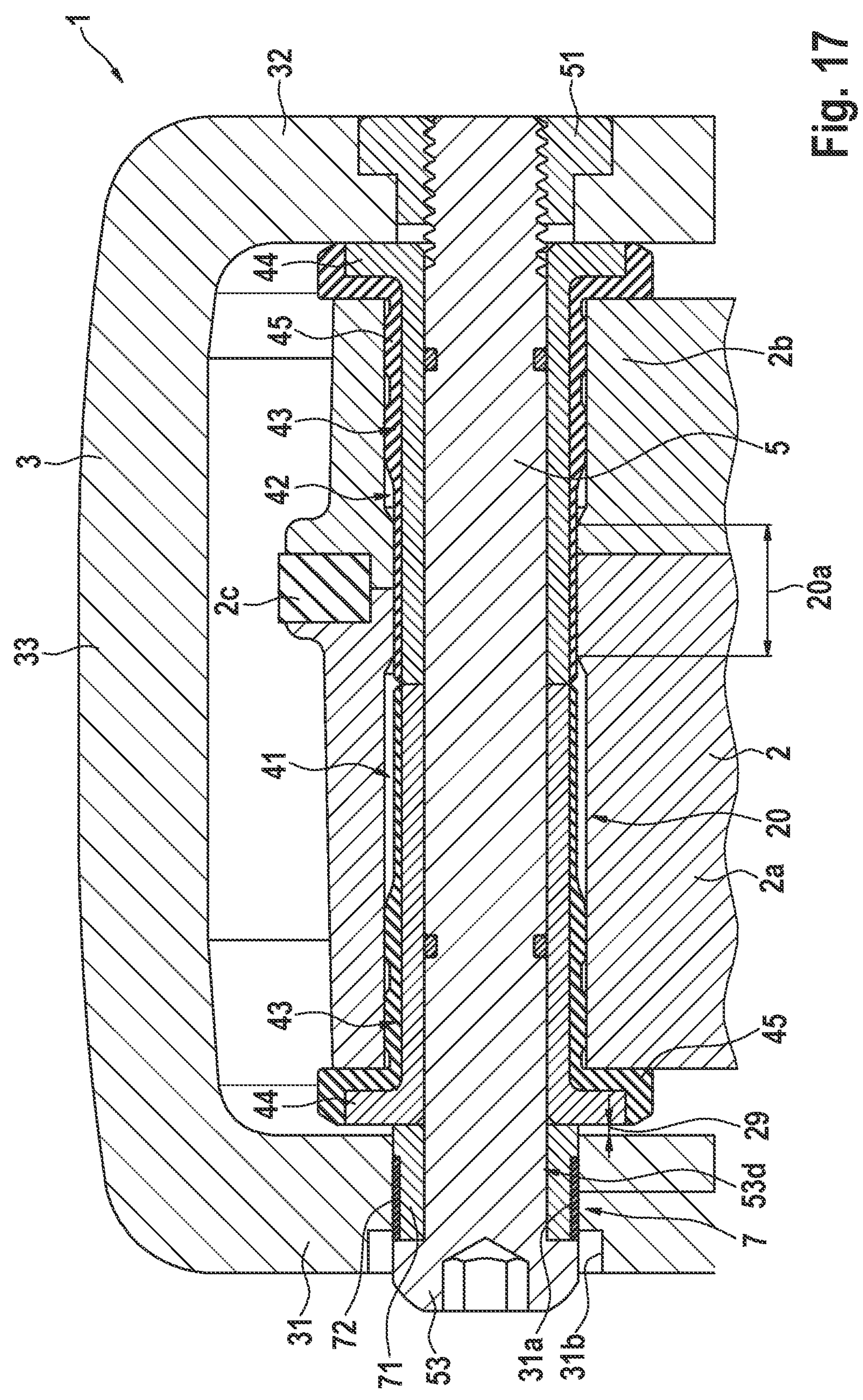

FIG. 17 shows a sectional view of a drive assembly 1 according to a tenth embodiment example of the disclosure. The tenth embodiment example substantially corresponds to the first embodiment example of FIGS. 1, 2 and 8A to 10, with the difference of an alternative design of the floating bearing on the first wall 31. In the tenth embodiment example of FIG. 17, the through-bolt 5 and the tolerance compensation element 7 are mounted together axially movably relative to the first wall 31. In this case, in contrast to the first embodiment example, not the bolt head 53 but rather a bolt shank 53*d* of the through-bolt 5 is arranged within the tolerance compensation element 7. In the tenth embodiment example, the through-bolt 5 additionally clamps the tolerance compensation element 7 against the first sleeve 41. The through-bolt 5 and the tolerance compensation element 7 can thus slide together in the wall opening 31*a* of the first wall 31. The wall opening 31*a* also has an enlarged diameter 31*b* on the outside so that the bolt head 53 can be arranged partially within the wall opening 31*a*. Alternatively, the bolt head 53 can also be arranged entirely outside the wall opening 31*a*.

Figure 18:
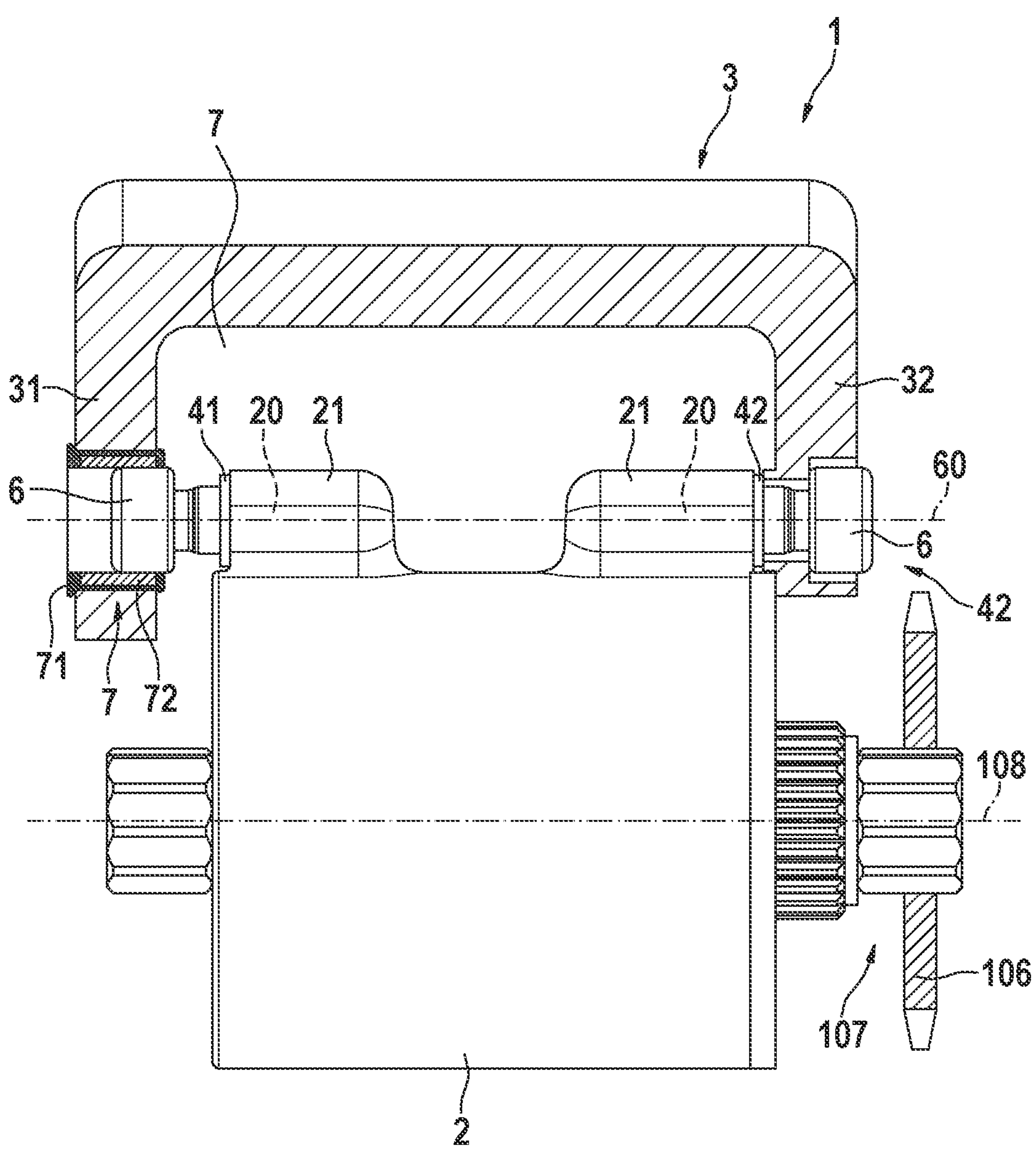

FIG. 18 shows a sectional view of a drive assembly 1 according to an eleventh embodiment example of the disclosure. The eleventh embodiment example substantially corresponds to the first embodiment example of FIGS. 1, 2 and 8A to 10, with the difference that instead of one through-bolt 5 per connection region 91, 92, exactly two individual screws 6 are provided. In addition, no through-bore 20 is provided in the drive unit 2, but rather separate openings 20 in which the sleeves 41, 42 are inserted. The openings 20 are formed in the flaps 21 protruding from the drive unit 2. In the eleventh embodiment example, the screws 6 are each screwed into an internal thread (not shown) of the respective sleeve. The eleventh embodiment example of FIG. 18 thus offers an alternative possibility of the screw connection, which can be advantageous, for example, depending on the amount of space available on the vehicle.

What is claimed is:

1. A drive unit of a vehicle which can be operated by means of muscle power and/or motor power, comprising:
 - a motor having a motor axis;
 - a crankshaft having a crank axis;
 - a transmission that mechanically couples the motor and the crankshaft; and
 - a housing in which the motor and the transmission are arranged,
 - wherein the transmission comprises at least a first gear wheel rotatable about the motor axis and a second gear wheel rotatable about the crank axis,
 - wherein the housing comprises precisely two fastening regions, the two fastening regions including a first fastening region and a second fastening region,
 - wherein the first fastening region and the second fastening region are configured to fasten the drive unit to a frame interface of the vehicle which can be operated by means of muscle power and/or motor power, wherein, in a cutting plane through the drive unit and orthogonal to the crank axis:

a longitudinal axis is defined that intersects the crank axis and the motor axis, and a first line is defined that is arranged orthogonally to the longitudinal axis and tangentially on an outer circumference of the motor, and wherein the first fastening region has a first center point arranged on the first line or on a side of the first line facing away from the crank axis.

2. The drive unit according to claim 1, wherein:

the longitudinal axis separates a vehicle-facing region and a region facing away from the vehicle from one another; and the first center point is arranged on the longitudinal axis or in the vehicle-facing region.

3. The drive unit according to claim 1, wherein:

the first center point lies within a first fastening sector;

the first fastening sector is bounded by a first and a second straight line each of which intersect the motor axis;

a first angle between the first straight line and the longitudinal axis is at least 5°; and a second angle between the second straight line and the longitudinal axis is at most 70°.

4. The drive unit according to claim 1, wherein a first distance of the first center point from the motor axis is at least 130% of a maximum radius of the motor.

5. The drive unit according to claim 3, wherein a second distance of the first center point from the crank axis is at least 150% of a longitudinal distance of the motor axis and crank axis.

6. The drive unit according to claim 5, wherein a third distance of the first center point from a second center point of the second fastening region is at least 120% of the second distance of the first center point from the crank axis.

7. The drive unit according to claim 6, wherein a fourth distance of the second center point from the crank axis is at most 180% of a maximum radius of the second gear wheel.

8. The drive unit according to claim 6, wherein:

the longitudinal axis separates a vehicle-facing region and a region facing away from the vehicle from one another; and the second center point of the second fastening region is arranged on the longitudinal axis or in the vehicle-facing region.

9. The drive unit according to claim 8, wherein:

in the cutting plane through the drive unit and orthogonal to the crank axis, a second line is defined, which is arranged orthogonally to the longitudinal axis and tangentially on an outer circumference of the second gear wheel; and the second center point of the second fastening region is arranged on a side of the second line facing the motor axis.

10. The drive unit according to claim 9, wherein:

in the cutting plane through the drive unit and orthogonal to the crank axis, a third line is defined, which is orthogonal to the longitudinal axis and which intersects the crank axis; and the second center point is arranged between the second line and the third line.

11. The drive unit according to claim 8, wherein:

a third straight line is defined, which intersects the crank axis and on which the second center point lies; and a third angle between the third straight line and the longitudinal axis is at least 40°.

12. The drive unit according to claim 6, wherein:

the longitudinal axis separates a vehicle-facing region and a region facing away from the vehicle from one another; and the second center point is arranged in the region facing away from the vehicle.

13. The drive unit according to claim 12, wherein:

in the cutting plane through the drive unit and orthogonally to the crank axis, a second line is further defined, which is arranged orthogonally to the longitudinal axis and tangentially on an outer circumference of the second gear wheel; and the second center point of the second fastening region is arranged on the second line or on a side of the second line facing away from the motor axis.

14. The drive unit according to claim 12, wherein:

a fastening axis is defined, on which the first center point lies, and which intersects the crank axis; and the second center point and the motor axis are arranged on the same side of the fastening axis.

15. The drive unit according to claim 14, wherein a fourth angle between the fastening axis and a connecting line of the crank axis and the second center point is at most 30°.

16. A drive assembly of a vehicle which can be operated by means of muscle power and/or motor power, comprising:

a drive unit according to claim 8; and a frame interface, wherein the drive unit is arranged at least partially between a first wall and a second wall of the frame interface, and wherein the housing of the drive unit is fastened to each of the two walls using the two fastening regions of the drive unit.

17. The drive assembly according to claim 16, wherein:

the frame interface comprises an articulation region configured to receive an articulation point of a backing structure of the vehicle;

the articulation is arranged in the vehicle-facing region;

the articulation region is arranged on the second line or on the side of the second line facing away from the motor axis;

a maximum width of the frame interface between the first wall and the second wall at a first connection region is greater than at a second connection region;

two screws are used per fastening region of the drive unit;

the housing of the drive unit is screwed to the two walls using the two screws are used per fastening region;

the drive unit comprises one through-bore per fastening region;

the drive unit comprises one through-bolt per fastening region which is inserted through the respective through-bore and fastens the drive unit to each of the two walls;

two sleeves are provided per through-bore, which are inserted on both sides into the respective through-bolt and through which the respective through-bolt is inserted;

the two sleeves contact one another within the through-bore;

the through-bolt clamps the two sleeves against one another;

each of the two sleeves comprises a shank and a flange;

each shank is arranged at least partially within the respective through-bore; and the flange is arranged outside the through-bore.

18. The drive assembly according to claim 17, wherein:

each of the two sleeves comprises a damping element which is arranged on a side of the flange facing the drive unit;

the damping element is made of a vibration-damping material;

the damping element at least partially surrounds the shank;

the two sleeves are designed such that, when they are fully inserted into the through-bore and not clamped, there is a predefined axial distance between the two sleeves inside the through-bore;

the predefined axial distance is designed such that in the clamped state, the axial distance is compensated by the clamping of the two sleeves using the through-bolt and by elastic deformation of the damping element;

on a side facing the corresponding wall, the flange of at least one sleeve comprises a plurality of protruding form-fitting elements;

the plurality of protruding form-fitting elements are configured to press into the wall as a result of the screw connection to the corresponding wall;

each of the plurality of protruding form-fitting elements comprises a pyramid or a cone protruding from a surface of the flange;

each of the plurality of protruding form-fitting elements comprises a recess in a surface of the flange adjacent to the pyramid or the cone;

the flange of at least one sleeve comprises a taper at a radially outer end and on the side facing the shank;

the taper is compensated by the damping element;

the drive unit comprises at least one protruding annular rib which is arranged concentrically to an openings formed in a flap protruding from the drive unit;

the protruding annular rib and the taper of the flange of the sleeve are arranged on the same radius with respect to a bore axis of the through-bore;

the through-bolt is fastened to the second wall;

the through-bolt clamps the two sleeves and the second wall against one another;

the through-bolt is axially movably held on the first wall;

the first wall comprises a first wall opening;

a tolerance compensation element is formed in the shape of a sleeve and is arranged within the first wall opening;

a bolt head or a through-bolt shank is arranged within the tolerance compensation element;

the tolerance compensation element comprises a sliding bearing bushing and a damping shell surrounding the sliding bearing bushing;

the sliding bearing bushing and the bolt head are designed such that the bolt head widens the sliding bearing bushing in the radial direction when the bolt head is arranged within the tolerance compensation element;

the sliding bearing bushing is formed in the manner of a slit;

the slit of the sliding bearing bushing is formed obliquely with respect to an axial direction of the sliding bearing bushing;

the damping shell comprises at least one sealing lip on a radially outside;

the at least one sealing lip is designed such that there is an axial form-fit between the damping shell and the first wall when the tolerance compensation element is arranged in the first wall opening;

the through-bolt is configured as a screw;

the through-bolt is screwed into an internal thread of the second wall or into a nut arranged on the second wall and the nut is arranged in a torsion-proof manner in a recess of the second wall; and the flange of at least one sleeve has a thickness that corresponds substantially to a wall thickness of the shank of the sleeve, or the flange of at least one sleeve has a thickness that corresponds to at least 1.5 times a wall thickness of the shank of the sleeve.

19. A vehicle which can be operated by means of muscle power and/or motor power, comprising:

the drive assembly according to claim 16.

20. The vehicle according to claim 19, further comprising a chainring which is connected to an output shaft of the drive unit, and wherein the second wall of the drive assembly is arranged on the side of the chainring.

* * * * *